US008444147B2

(12) United States Patent
Grauzer et al.

(10) Patent No.: US 8,444,147 B2
(45) Date of Patent: May 21, 2013

(54) MULTIPLE MODE CARD SHUFFLER AND CARD READING DEVICE

(75) Inventors: Atilla Grauzer, Las Vegas, NV (US); Oliver M. Schubert, Las Vegas, NV (US); James V. Kelly, Las Vegas, NV (US); James B. Stasson, Eden Prairie, MN (US); Feraidoon Bourbour, Eden Prairie, MN (US); Paul K. Scheper, Eden Prairie, MN (US)

(73) Assignee: SHFL entertainment, Inc., Las Vegas, NV (US)

( * ) Notice: Subject to any disclaimer, the term of this patent is extended or adjusted under 35 U.S.C. 154(b) by 145 days.

(21) Appl. No.: 12/834,653

(22) Filed: Jul. 12, 2010

(65) Prior Publication Data

US 2010/0276880 A1 Nov. 4, 2010

Related U.S. Application Data

(60) Division of application No. 10/954,029, filed on Sep. 29, 2004, now Pat. No. 7,753,373, which is a continuation-in-part of application No. 10/623,223, filed on Jul. 17, 2003, now Pat. No. 7,677,565, which is a continuation-in-part of application No. 10/261,166, filed on Sep. 27, 2002, now Pat. No. 7,036,818, which is a continuation-in-part of application No. 10/128,532, filed on Apr. 23, 2002, now Pat. No. 6,651,982, which is a continuation-in-part of application No. 09/967,502, filed on Sep. 28, 2001, now Pat. No. 6,651,981.

(51) Int. Cl.
*G06F 19/00* (2006.01)

(52) U.S. Cl.
USPC .................. 273/149 R; 277/148 R; 277/292; 277/293; 277/309; 463/12; 463/13; 463/22; 463/47

(58) Field of Classification Search
USPC ................ 463/10–13, 17–22, 25, 29, 40–42, 463/46–47; 273/138.1, 139, 142 B, 142 A, 273/142 J, 148 A, 148 R, 148 B, 149 P, 149 R, 273/150, 274, 292–293, 304, 306, 309
IPC ........................................................ G06F 19/00
See application file for complete search history.

(56) References Cited

U.S. PATENT DOCUMENTS 793,489 A 6/1905 Williams
1,014,219 A 1/1912 Hall (Continued)

FOREIGN PATENT DOCUMENTS

WO WO 87/00764 2/1987
WO WO 98/40136 9/1998

(Continued)

OTHER PUBLICATIONS

Scarne's Encyclopedia of Games by John Scarne, 1973, "Super Contract Bridge", p. 153.

(Continued)

*Primary Examiner* — Arthur O. Hall
(74) *Attorney, Agent, or Firm* — TraskBritt

(57) ABSTRACT

A multiple-mode card shuffling and/or card verification device includes a top surface, a card receiving area for receiving an initial set of playing cards, a randomizing or arranging system for the initial set of playing cards that can be disabled, a card collection surface in a card collection area for receiving randomized playing cards, the card collection surface receiving cards positioned so that all cards collected are below the top surface of the device, a card imaging system and an elevator for raising the card collection surface so that at least some randomized cards are elevated above the top surface of the device. The processor is programmed such that cards can be verified without changing an order of cards present in the card receiving area, verified during randomization, and randomized without card verification.

15 Claims, 11 Drawing Sheets

U.S. PATENT DOCUMENTS

| | | | |
|---|---|---|---|
| 1,885,276 | A | 11/1932 | McKay |
| 2,001,220 | A | 5/1935 | Smith |
| 2,001,918 | A | 5/1935 | Nevius |
| 2,016,030 | A | 10/1935 | Woodruff et al. |
| 2,043,343 | A | 6/1936 | Warner |
| 2,065,824 | A | 12/1936 | Plass |
| 2,778,644 | A | 1/1957 | Stephenson |
| 2,937,739 | A | 5/1960 | Levy |
| 2,950,005 | A | 8/1960 | MacDonald |
| 3,147,978 | A | 9/1964 | Sjöstrand |
| 3,235,741 | A | 2/1966 | Plaisance |
| 3,312,473 | A | 4/1967 | Friedman et al. |
| 3,595,388 | A | 7/1971 | Castaldi |
| 3,690,670 | A | 9/1972 | Cassady et al. |
| 3,716,238 | A | 2/1973 | Porter |
| 3,897,954 | A | 8/1975 | Erickson et al. |
| 3,944,230 | A | 3/1976 | Fineman |
| 4,159,581 | A | 7/1979 | Lichtenberg |
| 4,232,861 | A | 11/1980 | Maul |
| 4,361,393 | A | 11/1982 | Noto |
| 4,368,972 | A | 1/1983 | Naramore |
| 4,385,827 | A | 5/1983 | Naramore |
| 4,388,994 | A | 6/1983 | Suda et al. |
| 4,397,469 | A | 8/1983 | Carter, III |
| 4,497,488 | A | 2/1985 | Plevyak et al. |
| 4,512,580 | A | 4/1985 | Matviak |
| 4,513,969 | A | 4/1985 | Samsel, Jr. |
| 4,515,367 | A | 5/1985 | Howard |
| 4,534,562 | A | 8/1985 | Cuff et al. |
| 4,566,782 | A | 1/1986 | Britt et al. |
| 4,586,712 | A | 5/1986 | Lorber et al. |
| 4,659,082 | A | 4/1987 | Greenberg |
| 4,662,637 | A | 5/1987 | Pfeiffer |
| 4,667,959 | A | 5/1987 | Pfeiffer et al. |
| 4,741,524 | A | 5/1988 | Bromage |
| 4,750,743 | A | 6/1988 | Nicoletti |
| 4,759,448 | A | 7/1988 | Kawabata |
| 4,770,421 | A | 9/1988 | Hoffman |
| 4,807,884 | A | 2/1989 | Breeding |
| 4,822,050 | A | 4/1989 | Normand et al. |
| 4,832,342 | A | 5/1989 | Plevyak et al. |
| 4,876,000 | A | 10/1989 | Mikhail |
| 4,900,009 | A | 2/1990 | Kitahara et al. |
| 4,951,950 | A | 8/1990 | Normand et al. |
| 4,969,648 | A | 11/1990 | Hollinger et al. |
| 5,000,453 | A | 3/1991 | Stevens et al. |
| 5,067,713 | A | 11/1991 | Soules et al. |
| 5,118,114 | A | 6/1992 | Tucci |
| 5,121,921 | A | 6/1992 | Friedman et al. |
| 5,199,710 | A | 4/1993 | Lamle |
| 5,240,140 | A | 8/1993 | Huen |
| 5,261,667 | A | 11/1993 | Breeding |
| 5,275,411 | A | 1/1994 | Breeding |
| 5,288,081 | A | 2/1994 | Breeding |
| 5,303,921 | A | 4/1994 | Breeding |
| 5,356,145 | A | 10/1994 | Verschoor |
| 5,374,061 | A | 12/1994 | Albrecht |
| 5,382,024 | A | 1/1995 | Blaha |
| 5,382,025 | A | 1/1995 | Sklansky et al. |
| 5,390,910 | A | 2/1995 | Mandel et al. |
| 5,431,399 | A | 7/1995 | Kelley |
| 5,437,462 | A | 8/1995 | Breeding |
| 5,584,483 | A | 12/1996 | Sines et al. |
| 5,586,936 | A | 12/1996 | Bennett et al. |
| 5,605,334 | A | 2/1997 | McCrea, Jr. |
| 5,669,816 | A | 9/1997 | Garczynski et al. |
| 5,676,372 | A | 10/1997 | Sines et al. |
| 5,681,039 | A | 10/1997 | Miller |
| 5,683,085 | A | 11/1997 | Johnson et al. |
| 5,690,324 | A | 11/1997 | Otomo et al. |
| 5,692,748 | A | 12/1997 | Frisco et al. |
| 5,695,189 | A | 12/1997 | Breeding et al. |
| 5,707,287 | A | 1/1998 | McCrea, Jr. |
| 5,718,427 | A | 2/1998 | Cranford et al. |
| 5,722,893 | A | 3/1998 | Hill et al. |
| 5,768,382 | A | 6/1998 | Schneier et al. |
| 5,772,505 | A | 6/1998 | Garczynski et al. |
| 5,779,546 | A | 7/1998 | Meissner et al. |
| 5,803,808 | A | 9/1998 | Strisower |
| 5,911,626 | A | 6/1999 | McCrea, Jr. |
| 5,941,769 | A | 8/1999 | Order |
| 5,944,310 | A | 8/1999 | Johnson et al. |
| 5,989,122 | A | 11/1999 | Roblejo |
| 6,019,368 | A | 2/2000 | Sines et al. |
| 6,039,650 | A | 3/2000 | Hill |
| 6,061,449 | A | 5/2000 | Candelore et al. |
| 6,068,258 | A | 5/2000 | Breeding et al. |
| 6,093,103 | A | 7/2000 | McCrea, Jr. |
| 6,117,012 | A | 9/2000 | McCrea, Jr. |
| 6,126,166 | A | 10/2000 | Lorson et al. |
| 6,139,014 | A | 10/2000 | Breeding et al. |
| 6,149,154 | A | 11/2000 | Grauzer et al. |
| 6,165,069 | A | 12/2000 | Sines et al. |
| 6,165,072 | A | 12/2000 | Davis et al. |
| 6,213,310 | B1 | 4/2001 | Wennersten et al. |
| 6,217,447 | B1 | 4/2001 | Lofink et al. |
| 6,250,632 | B1 | 6/2001 | Albrecht |
| 6,254,096 | B1 | 7/2001 | Grauzer et al. |
| 6,254,484 | B1 | 7/2001 | McCrea, Jr. |
| 6,267,248 | B1 | 7/2001 | Johnson et al. |
| 6,270,404 | B2 | 8/2001 | Sines et al. |
| 6,299,536 | B1 | 10/2001 | Hill |
| 6,325,373 | B1 | 12/2001 | Breeding et al. |
| 6,346,044 | B1 | 2/2002 | McCrea, Jr. |
| 6,361,044 | B1 | 3/2002 | Block et al. |
| 6,403,908 | B2 | 6/2002 | Stardust et al. |
| 6,460,848 | B1 | 10/2002 | Soltys et al. |
| 6,490,277 | B1 | 12/2002 | Tzotzkov |
| 6,517,435 | B2 | 2/2003 | Soltys et al. |
| 6,517,436 | B2 | 2/2003 | Soltys et al. |
| 6,520,857 | B2 | 2/2003 | Soltys et al. |
| 6,527,271 | B2 | 3/2003 | Soltys et al. |
| 6,530,836 | B2 | 3/2003 | Soltys et al. |
| 6,530,837 | B2 | 3/2003 | Soltys et al. |
| 6,533,276 | B2 | 3/2003 | Soltys et al. |
| 6,533,662 | B2 | 3/2003 | Soltys et al. |
| 6,579,180 | B2 | 6/2003 | Soltys et al. |
| 6,579,181 | B2 | 6/2003 | Soltys et al. |
| 6,582,301 | B2 | 6/2003 | Hill |
| 6,622,185 | B1 | 9/2003 | Johnson et al. |
| 6,629,894 | B1 * | 10/2003 | Purton ............................ 463/47 |
| 6,651,981 | B2 | 11/2003 | Grauzer et al. |
| 6,726,205 | B1 * | 4/2004 | Purton ...................... 273/148 R |
| 6,941,180 | B1 | 9/2005 | Fischer et al. |
| 7,036,818 | B2 | 5/2006 | Grauzer et al. |
| 7,066,464 | B2 | 6/2006 | Blad et al. |
| 7,677,565 | B2 | 3/2010 | Grauzer et al. |
| 2002/0155869 | A1 | 10/2002 | Soltys et al. |
| 2003/0151194 | A1 | 8/2003 | Hessing et al. |
| 2005/0288083 | A1 | 12/2005 | Downs, III |

FOREIGN PATENT DOCUMENTS

| | | |
|---|---|---|
| WO | WO 99/52610 | 10/1999 |
| WO | WO 00/51076 | 8/2000 |
| WO | WO 2006/039308 | 4/2006 |

OTHER PUBLICATIONS

International Search Report for PCT/US2005/034737 dated Apr. 7, 2006 (WO06/039308).

* cited by examiner

MULTIPLE MODE CARD SHUFFLER AND CARD READING DEVICE

CROSS-REFERENCE TO RELATED APPLICATIONS

This application is a divisional application of U.S. patent application Ser. No. 10/954,029, filed Sep. 29, 2004, now U.S. Pat. No. 7,753,373, issued Jul. 13, 2010, which is a continuation-in-part of U.S. patent application Ser. No. 10/623,223, filed Jul. 17, 2003, now U.S. Pat. No. 7,677,565, issued Mar. 16, 2010, which is a continuation-in-part of U.S. patent application Ser. No. 10/261,166, filed Sep. 27, 2002, now U.S. Pat. No. 7,036,818, issued May 6, 2006, which is a continuation-in-part of U.S. patent application Ser. No. 10/128,532, filed Apr. 23, 2002, now U.S. Pat. No. 6,651,982, issued Nov. 25, 2003, which is a continuation-in-part of U.S. patent application Ser. No. 09/967,502, filed Sep. 28, 2001, now U.S. Pat. No. 6,651,981, issued Nov. 25, 2003.

TECHNICAL FIELD

This invention relates to a shuffling, sorting and deck verification apparatus for providing randomly arranged articles and especially to the shuffling of playing cards for gaming uses in a first mode, and provides verified decks or multiple decks of cards in a second mode. The invention also relates to a method and apparatus for providing randomly shuffled deck(s) of cards in a rapid and efficient manner and a capability of automatically calibrating the apparatus for various card sizes, card thicknesses, and for initial setup and having card reading capability for providing information on card rank and/or card suit on cards within the shuffler. The invention also relates to a device that can verify a set of cards (one or more decks) in a rapid non-randomizing event.

BACKGROUND

In the gaming industry, certain games require that batches of randomly shuffled cards are provided to players and sometimes to dealers in live card games. It is important that the cards are shuffled thoroughly and randomly to prevent players from having an advantage by knowing the position of specific cards or groups of cards in the final arrangement of cards delivered in the play of the game. At the same time, it is advantageous to have the deck(s) shuffled in a very short period of time so that there is minimal downtime in the play of the game.

Breeding et al., U.S. Pat. Nos. 6,139,014 and 6,068,258 (assigned to Shuffle Master, Inc.) describe a machine for shuffling multiple decks of playing cards in a batch-type process. The device includes a first vertically extending magazine for holding a stack of unshuffled playing cards, and second and third vertically extending magazines each for holding a stack of cards, the second and third magazines being horizontally spaced from and adjacent to the first magazine. A first card mover is positioned at the top of the first magazine for moving cards from the top of the stack of cards in the first magazine to the second and third magazines to cut the stack of unshuffled playing cards into two unshuffled stacks. Second and third card movers are at the top of the second and third magazines, respectively, for randomly moving cards from the top of the stack of cards in the second and third magazines, respectively, back to the first magazine, thereby interleaving the cards to form a vertically registered stack of shuffled cards in the first magazine. Elevators are provided in the magazines to bring the cards into contact with the card movers. This shuffler design is currently marketed under the name MD1® shuffler and MD1.1™ shuffler in the United States and abroad.

Sines et al., U.S. Pat. No. 6,019,368 describes a playing card shuffler having an unshuffled stack holder that holds an in-feed array of playing cards. One or more ejectors are mounted adjacent the unshuffled stack holder to eject cards from the in-feed array at various random positions. Multiple ejectors are preferably mounted on a movable carriage. Extractors are advantageously used to assist in removing playing cards from the in-feed array. Removal resistors are used to provide counteracting forces resisting displacement of cards, to thereby provide more selective ejection of cards from the in-feed array. The automated playing card shuffler comprises a frame; an unshuffled stack holder for holding an unshuffled array of playing cards in a stacked configuration with adjacent cards in physical contact with each other and forming an unshuffled stack; a shuffled array receiver for holding a shuffled array of playing cards; at least one ejector for ejecting playing cards located at different positions within the unshuffled stack; and a drive which is controllable to achieve a plurality of different relative positions between the unshuffled stack holder and the at least one ejector. This shuffler design is currently marketed under the name RANDOM EJECTION SHUFFLER™.

Grauzer et al., U.S. Pat. No. 6,149,154 (assigned to Shuffle Master, Inc.) describes an apparatus for moving playing cards from a first group of cards into plural groups, each of said plural groups containing a random arrangement of cards, said apparatus comprising: a card receiver for receiving the first group of unshuffled cards; a single stack of card receiving compartments generally adjacent to the card receiver, said stack generally adjacent to and movable with respect to the first group of cards; and a drive mechanism that moves the stack by means of translation relative to the first group of unshuffled cards; a card moving mechanism between the card receiver and the stack; and a processing unit that controls the card moving mechanism and the drive mechanism so that a selected quantity of cards is moved into a selected number of compartments. This shuffler is currently marketed under the name ACE® shuffler in the United States and abroad.

Grauzer et al., U.S. Pat. No. 6,254,096 (assigned to Shuffle Master, Inc.) describes an apparatus for continuously shuffling playing cards, said apparatus comprising: a card receiver for receiving a first group of cards; a single stack of card receiving compartments generally adjacent to the card receiver, said stack generally vertically movable, wherein the compartments translate substantially vertically, and means for moving the stack; a card moving mechanism located between the card receiver and the stack; a processing unit that controls the card moving mechanism and the means for moving the stack so that cards placed in the card receiver are moved into selected compartments; a second card receiver for receiving cards from the compartments; and a second card moving mechanism between the compartments and the second card receiver for moving cards from the compartments to the second card receiver. This shuffler design is marketed under the name KING® shuffler in the United States and abroad.

Johnson et al., U.S. Pat. No. 5,944,310 describes a card handling apparatus comprising: a loading station for receiving cards to be shuffled; a chamber to receive a main stack of cards; delivery means for delivering individual cards from the loading station to the chamber; a dispensing station to dispense individual cards for a card game; transfer means for transferring a lowermost card from the main stack to the dispensing station; and a dispensing sensor for sensing one of the presence and absence of a card in the dispensing station. The dispensing sensor is coupled to the transfer means to cause a transfer of a card to the dispensing station when an absence of a card in the dispensing station is sensed by the dispensing sensor. Individual cards delivered from the loading station are randomly inserted by an insertion means into different randomly selected positions in the main stack to obtain a randomly shuffled main stack from which cards are individually dispensed. The insertion means includes vertically adjustable gripping means to separate the main stack into two spaced apart substacks to enable insertion of a card between the substacks by the insertion means. The gripping means is vertically positionable along the edges of the main stack. After gripping, the top portion of the stack is lifted, forming two substacks. At this time, a gap is created between the stacks. This shuffler is marketed under the name QUICKDRAW™ shuffler in the United States and abroad.

Similarly, Johnson et al., U.S. Pat. No. 5,683,085 describes an apparatus for shuffling or handling a batch of cards including a chamber in which a main stack of cards is supported, a loading station for holding a secondary stack of cards, and a card separating mechanism for separating cards at a series of positions along the main stack. The separating mechanism allows the introduction of cards from the secondary stack into the main stack at those positions. The separating mechanism grips cards at the series of positions along the stack and lifts those cards at and above the separation mechanism to define spaces in the main stack for introduction of cards from the secondary stack. This technology is also incorporated into the QUICKDRAW™ product.

Sines et al., U.S. Pat. No. 5,676,372 describes an automated playing card shuffler, comprising: a frame; an unshuffled stack holder for holding an unshuffled stack of playing cards; a shuffled stack receiver for holding a shuffled stack of playing cards; at least one ejector carriage mounted adjacent to said unshuffled stack holder, said at least one ejector carriage and said unshuffled stack holder mounted to provide relative movement between said unshuffled stack holder and said at least one ejector carriage; a plurality of ejectors mounted upon said at least one ejector carriage adjacent the unshuffled stack holder for ejecting playing cards from the unshuffled stack, the ejecting occurring at various random positions along the unshuffled stack.

Johnson et al., U.S. Pat. No. 6,267,248 describes an apparatus for arranging playing cards in a desired order, said apparatus including: a housing; a sensor to sense playing cards prior to arranging; a feeder for feeding said playing cards sequentially past the sensor; a storage assembly having a plurality of storage locations in which playing cards may be arranged in groups in a desired order, wherein the storage assembly is adapted for movement in at least two directions during shuffling; a selectively programmable computer coupled to said sensor and to said storage assembly to assemble in said storage assembly groups of playing cards in a desired order; a delivery mechanism for selectively delivering playing cards located in selected storage locations of the storage assembly; and a collector for collecting arranged groups of playing cards. The storage assembly in one example of the invention is a carousel containing a plurality of card storage compartments. The device describes card value reading capability and irregular (e.g., missing or extra) card indication. The desired orders described include pack order and random order.

Grauzer et al., U.S. Pat. No. 6,651,981, assigned to Shuffle Master, Inc., describes a device for forming a random set of playing cards including a top surface and a bottom surface, and a card receiving area for receiving an initial set of playing cards. A randomizing system is provided for randomizing the initial set of playing cards. A card collection surface is located in a card collection area for receiving randomized playing cards, the card collection surface receiving cards so that all cards are received below the top surface of the device. An elevator is provided for raising the card collection surface so that at least some randomized cards are elevated at least to the top surface of the device. A system for picking up segments of stacks and inserting cards into a gap created by lifting the stack is described.

U.S. Pat. No. 5,605,334 to McCrea, Jr., describes a secure game table system for monitoring each hand in a progressive live card game. The progressive live card game has at least one deck with a predetermined number of cards, the secure game table system having players at a plurality of player positions and a dealer at a dealer position. The secure game table system comprises: a shoe for holding each card from at least one deck before being dealt by the dealer in the hand, the shoe having a detector for reading at least the value and the suit of each card, the detector issuing a signal corresponding at least to the value and suit for the card. A card-mixing system may be combined or associated with the card-reading shoe. A progressive bet sensor is located near each of the plurality of player positions for sensing the presence of a progressive bet. When the progressive bet is sensed, the progressive bet sensor issues a signal corresponding to the presence of the wager. A card sensor located near each player position and the dealer position issues a signal when a card in the hand is received at the card sensor. A game control has a memory and is receptive of progressive bet signals from the progressive bet sensor at each player position for storing in memory which player positions placed a progressive bet. The game control is receptive of value and suit signals from the detector in the shoe for storing in memory at least the value and suit of each card dealt from the shoe in the hand. The game control is receptive of card-received signals from card sensors at each player position and the dealer position for correlating in memory each card dealt from the shoe in game sequence to each card received at a player position having a progressive bet sensed. The specification indicates that FIG. 16 is an illustration setting forth the addition of a single card reader to the automatic shuffler of U.S. Pat. No. 5,356,145, to Verschoor. In FIGS. 16 and 17 is set forth another embodiment of the secure shuffler of the U.S. Pat. No. 5,605,334, based upon the shuffler illustrated in FIGS. 12-16 of U.S. Pat. No. 5,356,145. The shuffler may be mounted on a base in which is contained a camera with a lens or lenses and the camera may be embedded in a base of the shuffler.

U.S. Pat. No. 6,361,044 to Block et al. describes a top of a card table with a card-dispensing hole therethrough and an arcuate edge covered by a transparent dome-shaped cover. A dealer position is centrally located on the tabletop. Multiple player stations are evenly spaced along the arcuate edge. A rotatable card placement assembly includes an extendable arm that is connected to a card carrier that is operable to carry a card. In response to signals from a computer, the rotation of the assembly and the extension of the arm cause the card carrier to carry the card from the card dispensing hole to either the dealer position or any of the player positions. The card carries a barcode identification thereon. A barcode reader of the card carrier provides a signal representation of the identification of the card to the computer.

U.S. Pat. No. 6,403,908 to Stardust et al. describes an automated method and apparatus for sequencing and/or inspecting decks of playing cards. The method and apparatus utilize pattern recognition technology or other image comparison technology to compare one or more images of a card with memory containing known images of a complete deck of playing cards to identify each card as it passes through the apparatus. Once the card is identified, it is temporarily stored in a location corresponding to or identified according to its position in a properly sequenced deck of playing cards. Once a full set of cards has been stored, the cards are released in proper sequence to a completed deck hopper. The method and apparatus also include an operator interface capable of displaying a magnified version of potential defects or problem areas contained on a card which may be then viewed by the operator on a monitor or screen and either accepted or rejected via operator input. The device is also capable of providing an overall wear rating for each deck of playing cards.

Many other patents provide for card reading capability in different physical manners, at different locations, and in different types of apparatus, from card reading shoes, to card reading racks, to table security control systems, such as are disclosed in U.S. Pat. Nos. 4,667,959 (Pfeiffer et al.), 6,460,848 (Soltys et al., assigned to MindPlay LLC), 6,270,404 (Sines et al., automated system), 6,217,447 (Lofink et al.), 6,165,069 (Sines et al.), 5,779,546 (Meissner et al.), 6,117,012 (McCrea, Jr.), 6,361,044 (Block et al.), 6,250,632 (Albrecht), 6,403,908 (Stardust et al.), 5,681,039 (Miller), 5,669,816 (Garczynski et al., assigned to Peripheral Dynamics), 5,722,893 (Hill et al., assigned to Smart Shoes, Inc.), 5,772,505 (Garczynski et al., assigned to Peripheral Dynamics), 6,039,650 (Hill, assigned to Smart Shoes, Inc.), 6,126,166 (Larson et al., assigned to Advanced Casino Technologies), and 5,941,769 (Order, unassigned).

U.S. Pat. No. 6,629,894 to Purton and assigned to Dolphin Advanced Technologies Pty Ltd., of Victoria, Australia, discloses an apparatus for verifying a deck or plural decks of cards. The device includes a card in-feed tray, a card moving mechanism, a camera, a processor located on a card transport path and an accumulation tray. The apparatus is incapable of shuffling cards. Cards can be fed from either tray past a camera in order to verify the deck. The processor compares the read cards with stored values and then reports that outline deviations from expected values are printed. Examples of printed reports include the rank and suit of each card that is missing, or the rank and suit of extra cards present.

Although these and other structures are available for the manufacture of playing card shuffling apparatus, new improvements and new designs are desirable. In particular, it would be desirable to provide a batch-style shuffler that is faster, provides random shuffling, is more compact than currently available shuffler designs and is capable of reading the rank and/or suit of each card. Additionally, it would be desirable to use the device of the present invention to verify decks of cards either prior to use or as part of the decommissioning process.

BRIEF SUMMARY

A device for reading card information, forming a set of playing cards in a randomized order and/or reading card information and comparing the read information to stored information without shuffling is described. The device includes a top surface and a bottom surface, and a card receiving area for receiving an initial set of playing cards. The device is also capable of reading, recording, positioning and/or comparing information related to card rank, card suit, and specified card combinations. A randomizing system is provided for randomizing the initial set of playing cards. This randomizing system may be enabled in one mode of operation and disabled in another mode of operation. A card collection surface is located in a card collection area for receiving randomized or read playing cards, the card collection surface receiving cards so that all cards are received below the top surface of the device. An elevator is provided for raising the card collection surface so that at least some cards are elevated at least to the top surface of the device. An automatic system is provided in the device for accurately calibrating the vertical position of the card collection surface and identifying specific card level positions on stacks of cards placed onto the card collection surface. Sensors to identify at least one card level position and support surface positions are used to calibrate the performance of card pickup grippers, platform positions, and card positions on the platform. A calibration routine is performed by the device, and that automated calibration routine ensures a high level of performance of the device and reduces or eliminates the need for initial and periodic manual calibration and for technical maintenance on the device. A camera is provided within the device for reading the values (e.g., suit and rank) of cards, the camera reading values after cards are introduced into the device, before they are collected into a randomized or original order set, and before they are removed. The device may also have an alternative mode, wherein cards are rapidly moved and read, but not shuffled, to verify complete sets of cards. In the alternative mode, the order of cards preferably stays the same from the beginning to the end of the verification process.

A device for forming a random set of playing cards is described. The device includes a top surface and a bottom surface and a receiving area for receiving an initial set of playing cards. A randomizing system is provided for randomizing the initial set of playing cards. A card collection surface is provided in a card collection area for receiving randomized playing cards. A card feed mechanism, in one faun of the invention, individually transfers cards from the receiving area into the card collection area. The device further includes an elevator for raising and lowering the card collection surface within the card collection area. At least one card supporting element within the card collection area supports and suspends a randomly determined number of cards within the card collection area. In one example of the invention, a pair of spaced-apart gripping members are provided to grasp the opposite edges of the group of cards being suspended. A card insertion point is created in the card collection area beneath the suspended randomly determined group of cards. The card feed mechanism delivers a card into the insertion point. Card values may be read at the time of or before card insertion. The cards are not required to be read as they are being removed from the shuffler (as in a reading head located in a dealer delivery portion of a shuffler), although such an additional reading capability may be added in some constructions (in addition to the internal reading of the rank and/or suit of cards) where there is a dealer card-by-card delivery section. Card present sensors may be provided to trigger camera activation so that the camera may distribute a single analog or digital snapshot of a card face and the camera does not have to send a steady stream of information. In other forms of the invention, the camera or other imaging device operates continuously. The card present sensors (trigger sensors) may initiate or activate the image-taking procedure by the camera by noting a leading edge of a card, a trailing edge of the card, a time frame when the sensor is blocked, or a delayed activation (e.g., the card triggers an image-taking event to occur after a specified time has elapsed, such as the time expected for a card to move from trigger sensor to the camera focal plane). A leading edge sensor may trigger camera activity when the leading edge of the card has passed over the camera focal point, and the edge then triggers the image-taking event at a time when the symbols are over the camera focal point or focal plane. A trailing edge sensor would trigger the camera event when the trailing edge has passed over the sensor, which is at a measured distance that places the symbols over the camera focal plane.

An automatic card shuffling device is disclosed. The device includes a microprocessor with memory for controlling the operation of the device and/or, optionally, the imaging device. An in-feed compartment is provided for receiving cards to be randomized. In one example of the invention, the lower surface of the in-feed compartment is stationary. In another example of the invention, the lower surface is movable in a vertical direction by means of an elevator. A card moving mechanism moves cards individually from the in-feed compartment into a card mixing compartment. The card-mixing compartment includes a plurality of substantially vertical supports and an opening for the passage of individual cards from the in-feed compartment. In one form of the invention, the opening consists of a slot. The card mixing compartment also includes a movable lower support surface and at least one stationary gripping arm, a lower edge of the gripping arm being proximate to the opening and the gripping arm, the opening allowing for the passage of cards into the card mixing compartment just below the gripped group of cards. The gripping arm is capable of suspending a card or a group of cards of a randomly determined size above the opening. In one example, the opening is a horizontal slot.

The device preferably includes an integrally formed automated calibration system. One function of the automated calibration system is to identify the vertical position of the elevator support platform relative to a lowermost gripping position of the grippers so that the stack of cards in the card mixing compartment can be separated at a precise location in the stack and so that a specific numbers of cards can be accurately lifted and specific card insert positions can be determined for insertion of cards into the randomizing stack of cards. Another function of the automated calibration system of the present invention is to automatically adjust the position of the grippers to compensate for different card length, width and/or card thicknesses. In one form of the invention, card values are read before or during card insertion. The value of the read card(s) may be stored in memory in the shuffling/randomizing device or sent to a distal memory for storage and/or immediate use.

Another function of the automated calibration system is to determine the number of incremental movements of elevator stepper motors that corresponds to the thickness of each card. This information is then used to determine a precise location of the elevator in order to form each point of separation in the group of cards during shuffling.

An elevator is provided for raising and lowering a movable card support surface. In the shuffling mode, a vertical position of the elevator is randomly selected and the support surface is moved to the selected position. After the gripping arm grasps at least one side of the cards, the elevator lowers, suspending a group of cards, and creating a space (or point of insertion) beneath the gripping arm, wherein a single card is moved from the in-feed compartment into the space created, thereby randomizing the order of the cards.

In the deck verification mode, the elevator is lowered during operation such that cards are fed in just above an uppermost card supported by an upper surface of the elevator. This position is desirable because it prevents cards from upturning and also prevents cards from being stood up on their sides or otherwise jamming the device. The gripping arm or arms remain opened (disabled) so that no cards are suspended above the opening between the in-feed compartment and the shuffling chamber.

A method of calibrating a shuffling machine prior to and during the randomization of a group of cards is described. The method comprises the steps of placing a group of cards to be randomized into a card in-feed tray and removing a calibration card from the in-feed tray, and placing the card in the card randomizing area, also known as the card collection area. The elevator and grippers are operated until a precise location of the bottommost card that can be gripped is identified. Either before or after this calibration process, the card width is measured, and the grippers are adjusted to put sufficient tension on the cards to suspend the entire group of cards to be shuffled.

According to the invention, cards are individually fed from the card in-feed tray and delivered into a card collection area. The card collection area has a movable lower surface, and a stationary opening for receiving cards from the in-feed tray. The method includes elevating the movable lower surface to a randomly determined height and grasping at least one edge of a group of cards in the card collection area at a point just above the stationary opening. The method further includes the steps of lowering the movable lower surface to create an opening in a stack of cards formed on the lower surface, the opening located just beneath a lowermost point where the cards are grasped and inserting a card removed from the in-feed tray into the opening.

A device capable of automatically calibrating is described that is capable of automatically making adjustments to process cards of different dimensions. The device includes a card in-feed tray, a card moving mechanism that transports cards from the in-feed tray into a card collection area; an elevator within the card collection area that raises and lowers the group of fed cards; a device capable of suspending all or part of the fed cards above the card feeder; and a microprocessor that selects the position in the stack where the next card is to be inserted, and instructs the device capable of suspending and the elevator to create a gap, and then instructing the card moving mechanism to insert the card.

DETAILED DESCRIPTION

Figure 1:
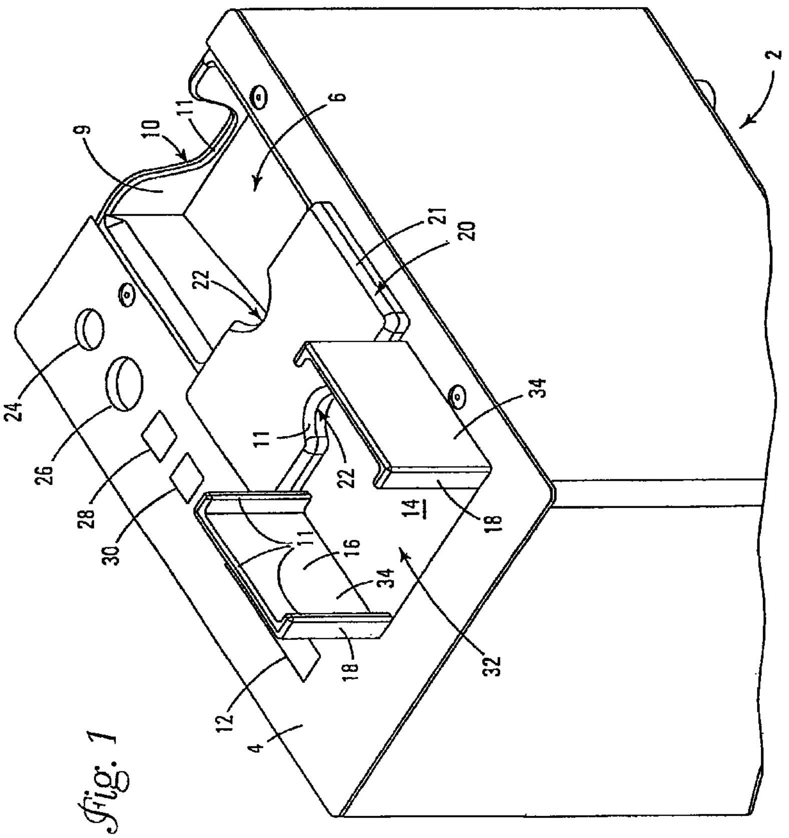
FIG. 1 shows a perspective view of an example of an exterior shell of a shuffling apparatus of the present invention.

A dual-mode automatic shuffling and deck verification device is described for forming a randomly arranged set of playing cards or verifying groups of cards. One embodiment of the device of the present invention shuffles between one and eight or more decks of cards (standard deck or decks of 52 cards each or 52 cards plus one or two jokers) and is particularly well suited for providing randomized batches of cards for games such as single-deck blackjack, poker, double deck blackjack, and multi-deck blackjack, for example. Another embodiment of the invention is suitable for shuffling either a single deck or two decks of cards.

The device includes a top surface and a bottom surface, a card receiving area for receiving an initial set of playing cards to be randomized and a randomizing system for randomizing an order of the initial set of playing cards. The device further includes a card collection area and a card collection surface within the card collection area for receiving randomized playing cards, the card collection surface receiving cards in a manner such that all cards that are inserted into the card collection surface are fed below the top surface of the device. An elevator in the shuffling mode is provided for raising and lowering the card collection surface during shuffling, and elevating the shuffled (alternatively referred to as "randomized") group of cards at least as high as the top surface of the device after shuffling (that is, the lowest card in the shuffled group of cards is raised to a level where it may be easily and manually removed from that level, preferably with the lowest card being level with or above a plane defining the top surface of the device). In the card verification mode, the elevator is positioned just below an opening between the card feeding mechanism and the upper surface of a top card on the elevator, and is lowered during card transfer to prevent cards from falling and turning over and/or becoming wedged in the area surrounding the elevator.

A card suspension mechanism, such as a pair of oppositely spaced grippers, grasps some or all of the cards on the card collection surface in the shuffling mode. The elevator is lowered, creating a gap or point of insertion for the next card to be fed. Once shuffling is complete, the cards are elevated so that they can be removed by an attendant or dealer and used for dealing. While cards are being dealt, a second group of cards is being randomized. The use of two groups of cards eliminates any waiting on the part of the dealer or the casino patrons between rounds of play. In the card verification-only mode, the grippers remain open and do not contact cards. Each card is removed from the bottom of the stack of cards in the in-feed tray and is placed on top of any cards present on the elevator. The order of the cards after verification advantageously remains the same during the verification mode.

In yet another mode of operation, the device shuffles and verifies the composition of the deck in a single operation. In a preferred mode, as will be more completely described below, the cards remain in their original order. Some casinos may prefer to verify the composition of one deck or multiple decks of cards and at the same time randomize the cards so they are ready for insertion into a shoe. The device of the present invention is capable of delivering verified cards in the original order or in a random order, with or without card imaging.

Because the device is able to transport cards rapidly and read card values (e.g., suit and rank, or special values, such as wild cards, jokers, etc.), the device may be used as a deck verification system as well as card shuffler/randomizer. There are a number of modes by which this can be practiced. One method is to have the device shuffle or randomize a complete set of cards and have each and all of the cards of the set read at the same time and compared to the expected content (e.g., in a look-up table for a regular or special deck, a number of regular or special decks, and the like). By comparing the read values to the stored values, the set of cards can be verified. The stored values can be provided from previously prepared stored data, a previous reading of the set of cards (e.g., during an earlier shuffle/randomization) or from a separate reading of the cards from a separate device, such as a card-reading tray (e.g., U.S. Pat. No. 6,460,848), or a dealing shoe (e.g., U.S. Pat. Nos. 6,403,908; 5,605,334; 6,039,650; and 5,722,893). It might also be necessary to use machine vision software and train the device to read and understand a particular manufacturer's brand of cards. Or, packs of cards can be read in and used as stored values. Comparison to the earlier stored values can be performed in the microprocessor in the shuffling device, or the information can be output from a port to an external processor (e.g., central computer) that also has the stored values, or at both locations.

In addition to data being output from a port directly into an external computer, the microprocessor may be equipped to communicate directly with a network, and also perform the functions of a G-Mod. Examples of functions performed by a G-Mod may include date- and/or time-stamping data, organizing data, and transmitting the data to a remote database via a network connection, such as TCP/IP or other data transmission method. Or, the microprocessor could be in communication with an external G-Mod that in turn communicates with a network. The precise distribution of functionality between the internal processor, G-Mods and network computer is a function of the requirements of the data acquisition device (in this case, a card shuffler and/or deck verification module) and the capability of the various processors. As processors become smaller and more powerful, the functions may be transferred away from a central controller and the architecture can approach or actually reach complete decentralized control. For a more complete discussion of the structure and functions of G-Mods and their use in decentralized control structures in gaming systems, see U.S. patent application Ser. No. 10/880,408, the content of which is hereby incorporated by reference.

A more preferred method would be to actuate a special mode within the shuffling device wherein cards would be removed one at a time from the card in-feed tray of the shuffler (possibly in an order that had already been read from another device or by the shuffling device in an earlier reading of the cards), and there is a special support plate or an upper surface of the elevator that can receive the entire set of cards without having to create openings for card insertion. For example, the grippers could be deactivated and all cards could be transferred in an original order onto the support plate. This can speed up the card set validation as compared to an actual shuffling or randomization process. In this fast verification mode, the camera may operate with single, quick shot images of each card or provide the data in a steady stream, since there would be less data (because of the faster movement of the cards and set of cards) as compared to a shuffling procedure. The data stream in the fast verification mode would not be as excessive as in a shuffling mode. Cards could be read when stationary or in motion, in the card in-feed tray or during transfer onto the support plate.

There are a number of special features that combine to make the present invention a significant advance over previously described card shuffling systems and card shuffling processes. Individual features that constitute an advance, alone or in combination with other features, include a system for automatically calibrating and inspecting the position and performance of an elevator for moving the final set of randomized cards upwardly so that the stack is accessible to the dealer or attendant. In one example of the invention, the elevator elevates the group of cards to the playing table surface. The same elevator advantageously assists in accomplishing shuffling within the card collection and/or mixing area.

The card collection area in another example of the invention, has a plurality of vertical supports (e.g., two or three walls, or four walls with a manually accessible area where the lowest card may be gripped), and a movable lower surface. The elevator supports this movable lower surface (also referred to herein as the card collection surface) and causes the surface to move back and forth (relatively up and down) in a substantially vertical direction. One function of the movement of the elevator (during the shuffling or randomizing mode) is to position a stack of cards within the card collection area so that a card or cards can be inserted into the stack in a specifically selected or randomly selected precise position within the stack to randomize, organize or arrange the cards in a desired order, such as "pack order" for inspection (particularly after reading the suit and rank of cards), or to randomize the cards into a shuffled set of cards that can be dealt to players. The insertion of cards may be performed in a number of ways, such as by lifting or by dropping a section of the stack and inserting one or more (and preferably just one) cards into the gap, by positioning the stack near a card insertion position and inserting one or more cards into the stack, or inserting a wedge-like element or blade between cards in the stack to elevate a portion of the stack where card(s) may be inserted (as described in Breeding et al., U.S. Pat. No. 5,695,189 (assigned to Shuffle Master, Inc.), which is incorporated herein by reference).

In a preferred mode of operation of the shuffler of the present invention, a picking, gripping or separating system is provided for suspending segments of the stack of cards present in the card collection area during randomization, creating an opening in the group of cards so that a card or cards can be inserted in specific locations relative to other cards in the deck. A variant of this system is described in U.S. Pat. No. 6,651,981, issued Nov. 25, 2003 (assigned to Shuffle Master, Inc.). According to that invention, the picking, gripping or card suspending system is fixed in the vertical direction. By randomly selecting a vertical position for the movable base of the card receiving area prior to picking, the location of an opening created in the stack of cards by gripping a portion of the cards and lowering another portion of the cards below the gripping area is varied, with random insertion of cards into these openings causing randomization of the cards.

Offset rollers are the preferred mechanism provided for moving the individual cards from the card receiving area into the card collection area, although air jets, belts, injection plates, injection blades, and the like, may also be used for moving individual cards or small numbers of cards (e.g., one, two, three, four or five cards) into the card receiving area. A stack stabilizing area is provided, in one example of the invention, for receiving an elevated final set of cards lifted from the card collection area. This stack stabilization area should be positioned or positionable above the top of the device or should begin at the top of the device. In another example of the invention, the elevator itself is equipped with a stack stabilizing structure that is lowered into the inside of the shuffler prior to the randomization of cards. In one embodiment later described in greater detail, a delivery or elevator platform provides its own card stabilization area or in conjunction with an elevator drive arm provides such a card stabilization area.

A single belt drive is provided, in one example of the invention, for driving two spaced-apart and opposed, vertically disposed picking elements in a card segment picking system. The picking elements are vertically disposed along the path of movement of the collection area of cards in the collection shaft, and are horizontally disposed or opposed with respect to each other. A microprocessor is provided that employs a random number generator to identify or create an intended (including random) distribution of an initial set of cards in the card receiving area at the conclusion of shuffling. The microprocessor executes movement of elements in the shuffling apparatus, including the opposed picking elements and the elevator, to effect placement of each card into spaces in the stack created by the shuffling apparatus, and a randomized set of cards is rapidly formed. That microprocessor (in the shuffling device or in an associated game device) or a separate or parallel microprocessor is used to direct the calibration steps. In one example of the invention, the picking elements move horizontally to grasp opposite edges of a group of cards during the shuffling and shuffling plus verification mode but remain open and out of contact with cards during the card verification mode. Other suspension systems are contemplated, such as inserting a flat member between the cards above the point of separation.

The individual and combined elements of the invention will be described in detail, after a more general description of the invention is provided. A first general description of the invention is a device for forming a randomized set of playing cards comprising: a top surface and a bottom surface of the device; a receiving area for an initial set of playing cards; a randomizing system for randomizing the order of the initial set of playing cards; a card collection surface in a card collection area for receiving the randomized playing cards; an elevator for raising the card collection surface within the card collection area; and at least one card supporting element within the card collection area that is horizontally fixed with respect to the vertical. The card supporting element will support and suspend a precise number of a randomly determined number of cards within the card collection area to create a gap or space within the stack of cards within the card collection area that is a card insertion point. The card insertion point or gap is created in the card collection area just below the lowermost portion of the card supporting element or elements. Each time, the card supporting elements support a next group of cards, and the elevator beneath the card collection area is lowered, lowering a remaining group of cards and creating a gap.

The device may have one or more card supporting elements comprising at least one card supporting element vertically disposed on at least one side of the card collection area. In the alternative, the card supporting elements include at least two opposed supporting elements, such as flexible or soft (e.g., polymeric, elastomer, rubber or rubber-coated) gripping elements, that can move inwardly along a horizontal plane within the card collection area to contact and support the opposite edges of at least a portion of the stack, or substack or group of cards. Alternatively, a horizontally disposed flat member, such as a pair of forks or a flat plate, may be inserted between the cards, so that when the elevator is lowered, an insertion point or gap is formed. A substack may be defined as all cards within the card collection area at or above a randomly selected card or position in the stack within the card collection area. The device desirably has a microprocessor communicatively connected to the device. The microprocessor in one example of the invention is programmed to determine a distance that the card supporting surface must be vertically moved in order to position each card in the desired order within the stack. In one example of the invention, cards fed into the card collection area may be placed anywhere in the stack, including the top or bottom position. This flexibility advantageously allows for a more random shuffle and avoids “dead” areas within the collected stack of cards.

The device of the present invention advantageously senses the length or width of the cards and adjusts the horizontal distance between the gripping arms so that cards of varying lengths or widths can be suspended. Whether the width or length is sensed depends on the designer’s selected location of the grippers within the card collection area.

In one example of the invention, the microprocessor instructs the device to feed a first card into the card collection area and to grip the card at a width representing the width of a standard group of cards. If the sensors sense that a card is suspended, no adjustments to a horizontal spacing between gripping aims is necessary. If no suspended cards are sensed, the microprocessor instructs an adjustable gripping support mechanism to move a preselected distance and the gripping and sensing process is repeated. When the final adjustment has been made, cards are suspended and their presence is sensed. The microprocessor then retains this gripping mechanism distance setting. Alternatively, when the processor instructs the grippers to suspend one or more cards and no suspended cards are sensed, the adjustment sequence is activated. This entire process will be described in further detail, below.

The microprocessor is communicatively connected to the device and is most preferably located within the exterior shell of the device. The microprocessor may be programmed to lower the card collection surface within the card collection area after the at least one card supporting element has contacted and supported cards suspending a group of cards within the card collection area, creating two vertically spaced substacks of cards, one suspended, separated by a gap or opening between the cards. Recognition of the presence of suspended and/or supported card(s) within the card collection area may be provided by sensors that are capable of sensing the presence of card(s) within the area by physical (e.g., weight), mechanical (e.g., pressure), electrical (e.g., resistance or conductance), optical (e.g., reflective, opacification, reading) or other sensing. The microprocessor may direct movement of one or more individual cards into the gap created between the two segments (upper and lower) of cards. The microprocessor may be programmed to randomly determine a distance that the card-supporting surface must be vertically moved in order to position at least one specific card relative to an opening created by the gripping of cards and subsequent lowering of the elevator. This method, including measurement of card thickness, will be described in more detail below. In the alternative, the microprocessor may be programmed to select a specific card position below or above a certain card, creating the gap. When the card-supporting element moves to contact cards within the card collection area, and the elevator moves the card-supporting surface downwardly, a gap is created for receiving the next card.

The microprocessor is also preferably programmed to direct the operation of the device in the card verification mode and the card shuffling and verification mode.

The elevator operates in a unique manner to position cards relative to the pickers or grippers within the shuffling chamber. This unique operation offers significant benefits that remove the need for human intervention in the setup or continuing operation of the shuffling device. Among the alternative and optional unique features of the operation of the shuffling device of the present invention are included the following sequence of events. These events need not necessarily be combined within a single process to represent inventive steps, as individual steps and combinations of two or more steps may be used to define inventive processes.

In order to calibrate the shuffling device of the present invention to operate for a particular card size, a calibration set of cards comprising at least one card (usually one, although two, three, four or more cards could be used) is inserted into the shuffling chamber prior to shuffling. The operator may activate a calibration sequence by manually inputting a request, or the device may be programmed to automatically advance through the calibration sequence upon power-up and card loading. The elevator base plate defining the base of the shuffling chamber moves the calibration set of cards to the position within the chamber approximating a position within the gripper (not necessarily at a level or equal position with the bottom of the grippers), and the grippers move inwardly (towards opposed edges of the cards) and attempts to grip the card(s). If the grippers grip the card(s), a sensor identifies either that the card(s) have been gripped by the grippers or that the card(s) remain on the card collection surface of the elevator (depending upon the position of the sensors). If there is no indication that a card(s) has been gripped, then the grippers move inwardly toward each other horizontally a set number of steps (e.g., “steps” being units of movement, as in movement through a microstepping motor or unit of movement through any other motivating system), and the process is repeated. This gripping, sensing and moving sequence is repeated until the sensor(s) sense that a card has been lifted off the support plate and/or is supported in the grippers. The microprocessor identifies a fixed progression of steps of predetermined sizes of steps that are used in this gripping calibration as well as the position that accomplished the gripping. These determinations of card dimensions, gripping positions and elevator position may be done independently and/or in concert.

It is logical to proceed with the gripping identification first. The grippers move inwardly a predetermined distance, initially and in repeated testing. For example, in the first gripping attempt, the grippers may move in 10 or 15 or other number of steps. A larger number than one step or unit is initially desirable to ensure that a rapid first grip is attained. After the first grip of a card(s) is sensed, then the microprocessor will widen the grip by fixed numbers of steps (here single steps may be used), with the widening occurring until no card is gripped. Once no card is gripped, a sufficient number of steps are added to the gripper movement to ensure gripping and even slight elastic bending of the card by the grippers so that more cards can be supported and so that cards will not slip. This may be 1, 2, 4, 5, 8, 10, 12, 15, or any other number of steps, to ensure that secure gripping is effected. This procedure defines the “gripping” and “card release” position of the grippers for a particular group of cards. The microprocessor records the stepper motor positions corresponding to the gripper positions and uses this information to position the grippers during shuffling.

Now the platform offset is to be set (as opposed to the gripper offset positioning). The elevator is put in a base or home position, which may be the position of the elevator (the height of the elevator) at the lowest position possible, or at a position below a framing support at the base of the collection chamber or some other predetermined position. The elevator is then raised in a series of a number of steps (again, in the initial gripping attempt, using larger numbers of steps is desirable to speed up the overall process, while during a more refined positioned identification/calibration sequence, smaller numbers of steps, even single steps, would be used) and the grippers are activated after each step, until the card is caught by the gripper for the first time. The number of steps moved each time for the first gripping action is preferably larger than single steps to ensure that this card will be gripped at the lowermost edge of the grippers. Again, this may be 1, 2, 3, 4, 5, 8, 10, 15, etc., steps (or any number in between, or a larger number of steps). Once the calibration card(s) is gripped, this is an indication that the platform has now raised the cards to at least the bottom of the grippers. Once gripping has occurred, the elevator is then lowered by a smaller number of incremental stop positions (a finer adjustment) and a new position evaluated as to whether the grippers would then grip the calibration card. The process is repeated until the calibration card is just below the lowermost gripping position. This position is then recorded in memory. The repositioning is accomplished by lowering the elevator and support plate to a position well below the grippers and then raising the plate to a position a predetermined number of steps lower than the last position where the card(s) was gripped, and sensing whether the card was gripped at the new position. Depending upon the arrangement of the sensors, plates, and cards, it is possible to merely ungrip the card, then lower the elevator one or more predetermined number of steps, then attempt to regrip the card, and sense whether the card has been gripped.

Once the card has been lowered just below the gripper, a second calibration card is added to the card collection surface. The elevator position is registered and/or recorded. The precision of the system enables options in the practice of the invention, such as the following. After a single card has been gripped, and a position determined where that single card will not be gripped with a slightly lowered elevator position (e.g., movement downward, which may be anywhere from 2 to 20 steps or more), another calibration card or cards may then be added to the shuffling chamber on top of the calibration card(s). The elevator and grippers may then be exercised, with the elevator moving single steps until the sensor(s) determine that one card has been gripped and lifted off the support plate and another card(s) remains on the support plate. To this position is added a number of steps equal to a card's thickness, and this final position is defined as the platform offset and identifies the position where the bottommost card would be lifted off of the support plate.

Prior to inserting the first calibration card, the elevator is raised to a predetermined sensed position in the card collection area, and that position or elevation is recorded in memory. After the first group of cards are inserted and randomized, the procedure is repeated, this time either measuring the height of the elevator when the top card in the stack was at the original height of the elevator, or measuring a new height of the top of the stack of cards when the elevator returns to that recorded position. The difference in distances represents the thickness of the deck or group of cards. As each card is fed into the card collection surface, the number of cards is counted and this number is recorded. The processor uses both pieces of information to calculate an average card's thickness, and to associate the number of motor steps to one card thickness. This information is then used in positioning the elevator for precise placement in the next shuffle.

At this point, all of the remaining cards in the deck(s) may be added to the shuffling chamber (either directly or into the card receiving chamber and then into the card-shuffling chamber). The system may then check on the efficiency of the grippers by raising the deck to a level where all cards should be gripped, the grippers grip the entire deck (one, two, three or more times), and the elevator lowered. If no cards are dropped in the chamber, the system may proceed to normal shuffling procedures. If the grippers leave a card or if a card falls back into the shuffling chamber, the gripper action may be automatically or manually (by an operator signal) adjusted to provided greater force on the cards, and the deck lift procedure is then attempted again, until the entire deck is lifted. The entire calibration process may have to be repeated if there is any uncorrectable failure in a complete deck lift test procedure. The shuffler preferably includes a multiple-segment information display as described in Breeding et al., U.S. Pat. No. 6,325,373, titled "Method and Apparatus for Automatically Cutting and Shuffling Playing Cards," the disclosure of which is herein incorporated by reference. The display may then indicate information relating to the state of the shuffler, such as the indication "AUTO ADJUST COMPLETE" or "LOAD ADDITIONAL CARDS," and the operator may proceed with normal shuffling procedures, with or without further instruction on the display panel.

The display may also advantageously be used to reflect the mode of operation of the machine. For example, the display might indicate "SHUFFLING," "VERIFYING," or "SHUFFLING AND VERIFYING," or additional modes, such as "SLEEP MODE" (indicating power is on but the device is not performing any function), or any other indication of the operation of the device.

The calibration process described above is preferably repeated periodically to compensate for swelling and bending of the cards. In a preferred form of the invention, two cards are fed into the device and separated prior to each shuffle to verify that the device is still properly calibrated. If the cards do not separate, the calibration sequence is repeated. The device of the present invention includes a jam recovery feature similar to that described in Breeding et al., U.S. Pat. No. 6,325,373. However, upon the fourth failure (or other number of failures) to recover from a jam, one or more of the calibration features described above are automatically activated.

This element of the total calibration process will thus calibrate the shuffling device in advance of any shuffling procedure with respect to the position of the bottom card (the card touching the elevator base plate or support plate) by moving the elevator up and down, by gripping and regripping the cards to identify a position where no cards are gripped and then a position where only one card is gripped. The other gripping-regripping procedure within the total calibration process will also identify and calibrate the shuffling apparatus with respect to the unique size of cards placed into the shuffling apparatus. Based on the knowledge of how many cards have been inserted into the shuffling chamber in the set (preferably one card and then two cards total), the microprocessor identifies and determines the position of the elevator support plate, the appropriate position of the elevator support plate with respect to the grippers and also the relative height of the number of cards in the set on the elevator card support plate. This information is stored for use with the particular stack of cards to be used in the shuffling process. When subsequent decks are inserted, the operator may optionally indicate that the decks are 'the same' or sufficiently similar that the entire process need not be performed or that the process may be initiated, or the machine may automatically make a check of a single card to determine if it appears to be the same size, and then initiate the shuffling program if the card is identified as the same size.

Additionally or alternatively, once the calibration set of cards has been first gripped, the grippers release the cards and regrip the cards, measuring any one or more of a) the position of the grippers relative to each other (with one or more of the two opposed grippers moving, the "steps" or other measurable indicator of extent of movement or position of the grippers) is determined and registered for use by the microprocessor; b) the force or tension between the grippers with the calibration set of cards or only one card gripped between the grippers; c) the height of a top card (or the single card) in the calibration set when cards are flexed by the force of the grippers (which may be measured by sensors positions in the shuffling chamber), or any other system may be used that identifies and/or measures a property or condition indicative of the gripping of the cards with a force in a range between a force insufficient to support the weight of the calibration set against slippage and bending the cards to a point where a card might lift off other cards in the calibration set. The calibration distance is typically in a range of between 93% and 99.5% of the width of the cards or, more typically, the length of the cards, as measured by gripper movement.

The positioning, repositioning and gripping of the cards are performed automatically and directed by the microprocessor or an additional microprocessor (there may even be a networked central control computer, but a microprocessor in the device is preferred). The elevator and the grippers are moved by steps or microsteps by a microstepping motor or other fine-movement control system (e.g., hydraulic system, screw system, geared system, and the like). The use of the automatic process eliminates the need for technicians to set up individual machines, which must be done at regular intervals because of wear on parts or when cards are replaced. As noted, the positioning may be performed with a calibration set as small as a single card. After the automated calibration or position determination has been performed, the microprocessor remembers that position and shuffling can be initiated with the stack of cards from which the calibration cards were taken.

This calibration or preshuffling protocol may be used in conjunction with any system where an elevator is used, whether with grippers, card inserting devices, injectors, and the like (as described above), and not only the specific apparatus shown in the figures. A similar calibration system for determining specific positions of carousel chambers in a carousel-type shuffling device may also be used, without grippers. The carousel may be rotated and the position of the shelves in the carousel with respect to other functional elements in the device may be determined. For example, card reading devices, card injection components, card removal elements, and card receiving chambers may be calibrated with regard to each other. As is understood by those ordinarily skilled in the art, there may be variations chosen among components, sequences of steps, and types of steps performed, with those changes still reflecting the spirit and scope of the invention disclosed herein.

In addition, the card collection chamber need not be vertically disposed. The chamber could be angled with respect to the vertical to improve contact between the card edges and the support structure located within the card collection area.

As noted, this description reflects a detailed description of the preferred practice of the invention with grippers. Alternative systems, such as those with injectors or stack wedges, may also be used with the calibration system of the invention with modifications reflecting the different systems. For example, where the calibration in the preferred embodiment addresses the level of the grippers with respect to cards and the elevator support plate, the system may be translated to calibration of air injectors, wedge lifters, and blade or plate injectors. This is done with an equivalent procedure for identifying the position of a card(s) placed on the support plate. For example, rather than performing repeated tests with a gripper, repeated tests may be performed with an air injector (to see when a card is ejected or injected by its operation), with a blade or plate injector (to see when a card is ejected or injected by its operation), or with a wedge separator with associated card(s) insertion (to see when the stack (e.g., a single card or a number of cards) is raised or when a card may be ejected or injected by its operation with minimum force).

The device of the present invention is also capable of monitoring card thickness and uses this information to accurately determine the location or position in the stack where separation is to occur. When combined with the ability to read card rank and suit, the device is capable of verifying that all cards are present and the final order of the cards.

In another embodiment, a first sensor located in the shuffling chamber senses the height of the platform within the shuffling chamber in its lowermost position prior to the beginning of the randomization process, when no cards are in the shuffling chamber. The sensor could also sense the platform position in any other predetermined or "home" position or assign such nomenclature to a position.

After randomization, when all cards have been transferred into the shuffling chamber, the platform is returned to this same position, and the same or another sensor located in the shuffling chamber (also referred to herein as the collection chamber) may sense the height of the top card in the stack. The difference between the two measurements represents the thickness of the stack of cards. This is an alternate method of measuring stack thickness.

Sensors (such as optical sensors, sonic sensors, physical sensors, electrical sensors, and the like, as previously described) sense cards as they are individually fed from the in-feed tray into the shuffling chamber. This information is used by the microprocessor to verify that the expected number of cards is present. In one example of the invention, if cards are missing or extra cards are present, the display will indicate a misdeal and will automatically unload.

The microprocessor uses the two height measurements and the card count to calculate an average card thickness. This thickness measurement is used to determine at what height the elevator must be in order to separate the stack between any two "target" cards. The average card thickness can be recalculated each time the shuffler is activated upon power-up, or according to a schedule, such as every 10 to 30 minutes, with 20-minute intervals as one preferred example.

The inventors have recognized that deck thickness increases the more the cards are used, as humidity in the air increases, and when cards become worn. Under humid conditions, it might be desirable to check the card thickness more often than every 20 minutes. Under extreme conditions of continuous use and high humidity, it might be desirable to recalculate an average card thickness after the completion of every shuffle.

A novel method of determining an average card thickness measurement during shuffling is disclosed herein as an invention. The method includes providing a stack of cards, providing a card feeder capable of relative motion between the card feeder and the stack, and measuring a home position of the stack platform. The home position indicates a height of the elevator platform when no cards are present in the stacking area. The method further includes feeding cards into the stacking area, counting a number of cards placed into the stacking area as they are fed, sensing a height of a topmost card in the stack when the elevator is returned to the same home position, and computing an average card thickness from the collected information (e.g., stack height divided by the number of cards equals the height per card).

The average card thickness is advantageously used to determine the position of card grippers used to grasp cards.

Upon lowering the platform beneath the grippers, an opening is formed at a precise predetermined location, allowing precise placement of the next card between two "target" cards.

According to the present invention, a sensor is positioned at a point of insertion into the group of cards in the card collection area. Each time a gap is formed, the sensor verifies that the gap is open, e.g., that no cards are suspended or are hanging due to static forces. The card feeder activates when the sensor indicates the opening is clear. This method avoids jams and provides faster shuffling as compared to programming a time delay between the gripping of cards and subsequent lowering of the elevator and the insertion of the next card.

Another general description of a preferred device according to the invention is a device for forming a randomized set of playing cards, the device comprising: a top surface and a bottom surface of the device; a receiving area for supporting an initial set of playing cards to be randomized; a randomizing system for randomizing the initial set of playing cards; and a card collection surface in a card collection area for receiving randomized playing cards, the card collection surface being movable in a vertical direction. In one example of the invention, cards are received onto the card collection surface, either positioned directly on the surface or positioned indirectly on a card supported by the surface. All cards being randomized in this example are inserted into the card collection area at a location below the top surface of the device. In one example of the invention, cards are fed individually off of the bottom of the stack located in the card receiving area and into the card collection area.

An elevator is provided for raising the card collection surface so that at the conclusion of shuffling, at least some randomized cards are elevated to a position at or above the top surface of the device. The elevator may be capable of raising all or part of the randomized cards at or above the top surface of the device. A cover may be provided to protect or mask the cards until they are elevated into a delivery position from which a dealer may remove the cards manually. The device may have a stack stabilizing area defined by a confining set of walls defining a shuffled card delivery area that confines all randomized cards along at least two, and preferably three edges after the randomized cards are elevated.

Alternatively, the card collection surface itself, elements positioned on the top surface of the shuffler or elements moved above the top surface of the shuffler may act to stabilize the cards so that they are more easily removed by the dealer's hand(s). The present invention also contemplates raising the shuffled group of cards to the top surface of the shuffler, where there are no confining structures around the cards. In one example of the invention, the top surface of the shuffler is flush-mounted into the gaming table surface, and the cards are delivered directly to the gaming table surface after shuffling.

The delivery area may be positioned such that its lower interior surface is at the same elevation as the top surface of the shuffler. The lower interior surface may be elevated above the top surface, or positioned beneath the top surface of the shuffler. In one example of the invention, the lower interior surface is at the same elevation as the top of the exterior of the shuffler. If the shuffler is mounted into and completely surrounded by a gaming table surface, it would be desirable to deliver cards so that the bottom card in the stack is at the same elevation as the gaming table surface.

The card receiving area may be sloped downwardly towards the randomizing system to assist movement of playing cards. The device may have at least one pick-off roller to remove cards one at a time, from the card receiving area and to move cards, one at a time towards the randomizing components of the system. Although in one example of the invention the randomizing system suspends cards and inserts cards in a gap created below the suspended cards, other randomization systems can be employed, such as the random ejection shuffling technique disclosed in Sines et al., U.S. Pat. No. 5,584,483, the disclosure of which is hereby incorporated herein by reference. At least one pair of speed-up rollers preferably receives cards from the at least one pick-off roller. A microprocessor preferably controls movement of the pick-off roller and the at least one pair of speed-up rollers. The first card is preferably moved by the pick-off roller so that, as later described in greater detail, movement of the pick-off roller is altered (i.e., stopped or otherwise altered so that tension contact with the card is reduced or ended) so that no card other than the first (lowermost) card is moved by either the pick-off roller or the at least one pair of speed-up rollers. This can be done by sensing of the movement or tension on the first card effected by the at least one pair of speed-up rollers, causing the pick-off roller to disengage from the drive mechanism and freely rotate and to not propel the card.

The microprocessor, for example, may be programmed to direct the pick-off roller to disengage from the drive mechanism and to cease propelling a first card being moved by the pick-off roller when it is sensed that the first card is being moved by the at least one pair of speed-up rollers. A preferred randomization system moves one card at a time into an area overlying the card collection surface. It is desirable to have one card at a time positioned into a randomized set of playing cards over the playing card collection surface. Again, as with the first general structure, the card collection area may be bordered on two opposed sides by two vertically disposed, horizontally opposed movable card supporting elements. There is preferably an insertion point, such as an opening or slot, to the card collection area that is located below a bottom edge of the two movable card supporting elements. The card supporting surface is vertically positionable within the card collection area, usually under the control and direction of a microprocessor. For example, the card supporting surface is moved by a motivator or elevator that is able to move incremental vertical distances that are no greater than the thickness of a playing card, such as incremental vertical distances that are no greater than one-half the thickness of a playing card. The motor may be, for example, a microstepper motor or an analog motor.

A sensor may be present within the collection area, below the top surface of the device, the sensor detecting a position of a top card of a group of cards in the card collection area below the group of suspended cards. In the alternative or in concert, the sensor detects the level of the card collection surface. In addition, a preferred embodiment of the device monitors the elevation of the top card when the two groups of cards are combined into one group, and adjusts for changes in the thickness of the deck due to swelling, humidity, card wear, bowing of cards, etc. A microprocessor is preferably present in the device to control vertical movement of the card collection surface. The sensor may identify the position of the card collection surface to place the top card at a position level with the bottom of at least one card supporting element that is movable substantially horizontally from at least one side of the card collection area towards playing cards within the card collection area.

In one example of the invention, an opening, such as a slot, is provided in a sidewall of the card collection area to permit transfer of cards from the card receiving area into the card collection area. The side wall may comprise a substantially solid support structure, adjoining edges of a plurality of vertical L-shaped corner support structures, or other equivalent structure capable of retaining a stack of cards in a substantially upright position. The microprocessor may be programmed to determine a distance that the card supporting surface must be vertically moved to position at least one specific card, including or other than the top card, at a bottom edge of the at least one card supporting element when the card supporting element moves to contact cards within the card collection area. As previously described, the at least one card supporting element may comprise at least two elements, such as gripping pads that move from horizontally opposed sides of the card collection area towards playing cards within the card collection area.

The microprocessor may be programmed to lower the card collection surface within the card collection area after the at least one card supporting element has contacted and supported cards within the card collection area, creating two vertically spaced-apart segments or substacks of cards, when the machine is shuffling cards. The microprocessor directs movement of an individual card into the card supporting area between the two separated segments of cards. The microprocessor may direct movement of playing card moving elements within the device. The microprocessor randomly assigns final positions for each card within the initial set of playing cards, and then directs the device to arrange the initial set of playing cards into those randomly assigned final positions to form a final set of randomized playing cards. Each card is inserted into the building stack of collected (randomized or shuffled) cards by positioning them in respect to the other cards already in the stack. Thus, even if a first card is not intended to be adjacent to a particular card, but is intended to be above that particular card, the first card is positioned above (and possibly adjacent to) the particular card, and intervening cards in the intended sequence added between the first card and the particular card.

In one embodiment of the invention, the card receiving area is located such that individual cards are fed off of the bottom of the stack, through the slot formed in the card collection area, directly beneath the gripping elements. In another example of the invention, a card loading elevator is provided so that the cards can be loaded into the card receiving area at an elevation higher than that of the first embodiment. The elevator then lowers the cards to a vertical position aligned with the feed mechanism. The use of an elevator on the card loading area is also an ergonomic benefit, as the dealer can keep hand and arm movements at a consistent level and does not have to reach into the device or have to drop cards into the device. The cards to be randomized can be inserted at a level approximately equal to the top of the shuffler, which can also be the height at which a randomized set of cards can be removed from the device.

When the device is used to process large batches of cards, such as groups of eight decks, it is desirable to provide a feed elevator to lower the entire batch of cards beneath the top surface of the shuffler prior to shuffling. The card feeding mechanism from the card receiving area to the card collection or shuffling area is necessarily positioned lower in a shuffler that processes more cards than in a shuffler that processes fewer cards.

When a large number of cards are to be inserted into the machine for shuffling, a retaining structure may be provided, consisting of a card stop or frame to limit card movement on up to three sides of the elevator. The open side or sides permit the dealer to load the stack from the side of the elevator, rather than trying to load the elevator from above, and allowing cards to fall freely and turn over.

A randomizing elevator is provided for moving the cards being randomized and operates to raise and lower the bottom card support surface of the card collection area. This elevator moves during randomization, and also aids in the delivery of the shuffled group of cards by raising the shuffled cards to a delivery area. Reference to the figures will assist in appreciation and enablement of the practice of the present invention. Upwardly extending side walls on the card collection surface, an elevator arm or extension of an elevator arm, or another element attached to the arm may move with the elevator and be used to move other portions of the shuffling apparatus. For example, the arm extension may be used to lift hinged or sliding covers over the cards as the cards are raised above a certain level that exceeds the normal shuffling elevation of the elevator.

FIG. 1 shows a partial perspective view of a top surface 4 of a first shuffling and card verification apparatus 2 according to a practice of the invention. In this example of the invention, the shuffling and verifying apparatus 2 randomizes and/or verifies one or two decks of cards (not shown). The shuffling and verifying apparatus 2 has a card accepting/receiving area 6 that is preferably provided with a stationary lower support surface that slopes downwardly from a nearest outer side 9 of the shuffling and verifying apparatus 2. A depression 10 is provided in that nearest outer side 9 to facilitate an operator's ability to place or remove cards into the card accepting/receiving area 6. The top surface 4 of the shuffling and verifying apparatus 2 is provided with a visual display 12 (e.g., LED, liquid crystal, micro monitor, semiconductor display, multi-segment display, etc.), and a series of buttons, touch pads, lights and/or displays 24, 26, 28 and 30. These elements on the top surface 4 of the shuffling and verifying apparatus 2 may act to indicate power availability (on/off), shuffler state (jam, active shuffling, completed shuffling cycle, insufficient numbers of cards, missing cards, sufficient numbers of cards, complete deck(s), damaged or marked cards, entry functions for the dealer to identify the number of players, the number of cards per hand, access to fixed programming for various games, the number of decks being shuffled, card calibration information, mode of operation (i.e., shuffling, verifying or both shuffling and verifying, and the like), or other information useful to the operator or casino.

Also shown in FIG. 1 is a separation plate 20 with a beveled edge 21 and two manual access facilitating recesses 22 that assists an operator in accessing and removing jammed cards between the card accepting receiving area 6 and a shuffled card return area 32. The shuffled card return area 32 is shown to be provided with an elevator surface 14 and two separated card-supporting sides 34. In a preferred embodiment, sides 34 are removable. When the shuffling and verifying apparatus 2 is flush-mounted into and surrounded by the top of a gaming table surface, removal of sides 34 enables the shuffling and verifying apparatus 2 to lift shuffled groups of cards onto the gaming table surface for immediate use. The card supporting sides 34 surround a portion of the elevator surface 14 with interior faces 16 and blocking extensions 18. It is desirable to provide rounded or beveled edges 11 on edges that may come into contact with cards to prevent scratching, catching or snagging of cards, or scratching of operators' fingers or hands.

Figure 2:
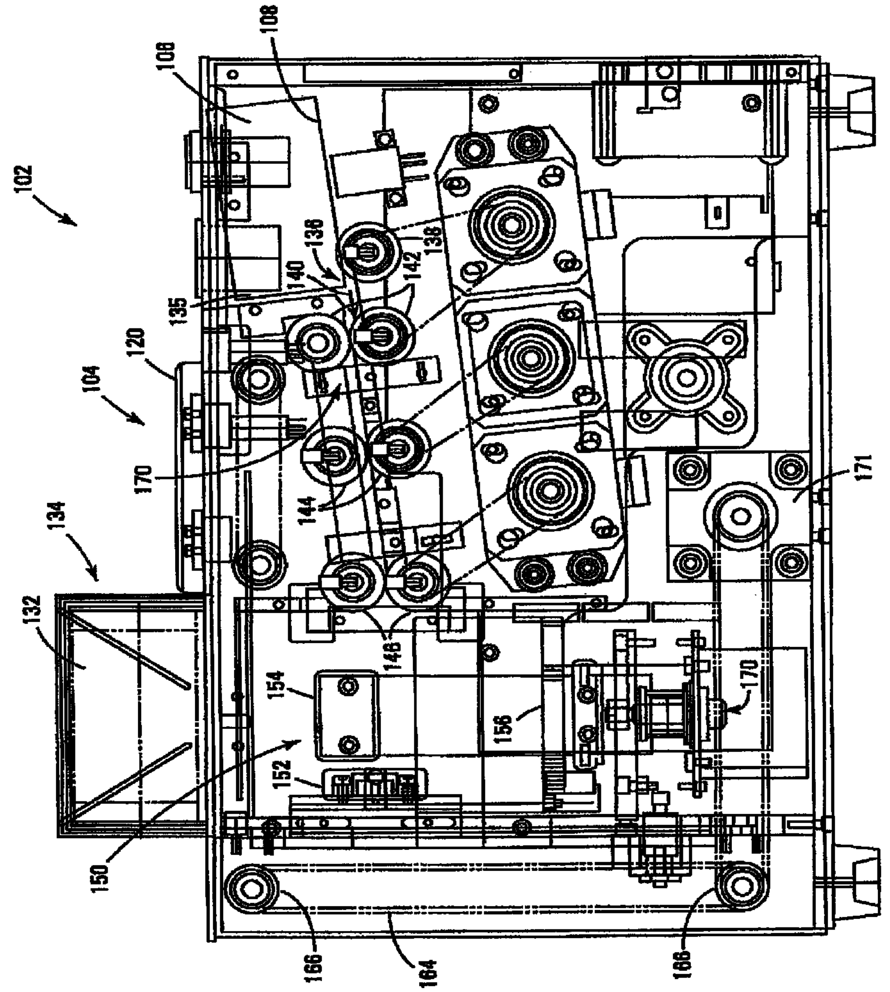
FIG. 2 shows a cutaway side view of internal elements of a shuffling apparatus according to teachings of the present invention.

FIG. 2 shows a side cross-sectional view of a first embodiment of a shuffling and verifying apparatus 102 according to the present invention. A top surface 104 is shown with a separation plate 120 and side panels 134 (card supporting sides) of a shuffled card return area 132. A card accepting/receiving area 106 is recessed with respect to the top surface 104 and is shown with a declining sloping support surface 108. At a front 135 of the sloping support surface 108 is an opening 136 (not able to be seen in the direct side view) or slot through which a bottom pick-off roller 138 may contact a bottom card in an unshuffled set of cards (not shown) within the card accepting/receiving area 106. The bottom pick-off roller 138 drives a card in direction 140 by frictional contact towards a first pair of nip rollers or offset rollers 142. In one example of the invention, the upper roller of offset rollers 142 is a break roller. This break roller retains the second top card for separation in the event that two cards are fed at the same time. In a preferred form of the invention, the upper roller does not rotate. In another form of the invention, the upper roller rotates, but is rotationally constrained.

There are two additional pairs of nip rollers or offset rollers 144 and 146 acting in concert (or only one of each pair is being driven) to move cards first moved by the first set of nip rollers 142. In a preferred practice of the present invention, the operation of the apparatus 102 may perform in the following manner in the shuffling mode. When a card (not shown) is moved from the unshuffled card accepting/receiving area 106, eventually another card in a stack of cards within the card accepting/receiving area 106 is exposed. The apparatus 102 is designed, programmed and controlled to operate so that individual cards are moved into the first set of nip rollers or offset rollers 142. If more than one card from the card accepting/receiving area advances at any given time (even if in partial sequence, with a portion of one card overlapping another card), it will be more difficult or even impossible for the apparatus to direct individual cards into predetermined positions and shuffle the cards randomly.

If two cards are moved at the same time and positioned adjacent to each other, this uncontrollably decreases the randomness of the shuffling and verifying apparatus 102. It is therefore desirable to provide a capability whereby, when a card is moved into the control area of the first set of nip rollers or offset rollers 142, the drive function of the bottom pick-off roller 138 ceases on that card and/or before the bottom pick-off roller 138 drives the next card. This can be effected by a wide variety of techniques controlled or directed by a microprocessor, circuit board, programmable intelligence or fixed intelligence within the apparatus.

Among the non-limiting examples of these techniques are: 1) a sensor so that when a pre-selected portion of the card (e.g., leading edge, trailing edge, and mark or feature on the card) passes a reading device, such as an optical reader, the bottom pick-off roller 138 is directed to disengage, revolve freely, or withdraw from the bottom of the set of cards; 2) the first set of nip rollers or offset rollers 142 may have a surface speed that is greater than the surface speed of the bottom pick-off roller 138, so that engagement of a card applies tension against the bottom pick-off roller 138 and the roller disengages with free-rolling gearing, so that no forward-moving (in direction 140) forces are applied to the first card or any other card exposed upon movement of the first card; 3) a timing sequence so that, upon movement of the bottom pick-off roller 138 for a defined period of time or for a defined amount of rotation (which correlates into a defined distance of movement of the first card), the bottom pick-off roller 138 disengages, withdraws, or otherwise stops applying forces against the first card and thereby avoids applying forces against any other cards exposed by movement of the first card from the card accepting/receiving area 106; and 4) providing a stepped surface (not shown) between bottom pick-off roller 138 and offset rollers 142 that contacts a leading edge of each card and will cause a card to be held up or retained in the event that more than one card feeds at a time.

The cards are eventually intended to be fed one at a time from final nip rollers or offset rollers 146 into a card mixing area 150. The cards in the card mixing area 150 are supported on elevator platform 156. The elevator platform 156 moves the stack of cards present in the card mixing area 150 up and down during shuffling as a group in proximity with a pair of separation elements 154. The pair of separation elements 154 grips an upper portion of cards, and supports those cards while the elevator drops sufficiently to provide an opening for insertion of a card into the stack. This movement within the apparatus 102 in the performance of the shuffling sequence offers a significant speed advantage in the shuffling operation as compared to U.S. Pat. No. 5,683,085, especially as the number of cards in the card mixing area 150 increases. Rather than having to lower the entire stack of cards to the bottom of the card receiving area and reposition the pickers (as required by U.S. Pat. No. 5,683,085), the cards in the present apparatus 102 may be dropped by the pickers or the elevator platform 156 needs to move only a slight distance to recombine the cards supported by the pair of separation elements 154 (e.g., a gripper, and insertion support, fingers, friction engaging support, rubber fingers, etc.) with the cards supported on the elevator platform 156. When the apparatus 102 is in the card verification mode, the elevator platform 156 rises to a point a few card thicknesses below the opening between the card accepting/receiving area 106 and the card mixing area 150, and lowers as the cards are transferred. The grippers are disabled and preferably remain open so that at the conclusion of card reading and transfer, the entire stack can be lifted to an upper surface (preferably the table game surface) and are free of interference by the grippers.

The stationary pair of gripping pads also maintains the alignment of the pads with respect to each other and grips the cards more securely than the device described in U.S. Pat. No. 5,683,085, reducing or eliminating the unintentional dropping of a card or cards that were intended to be gripped, rather than lowered. Whenever cards are dropped, the randomness of the final shuffle may be adversely affected. Although the first example of the invention shows a pair of oppositely positioned gripping members, it is possible to utilize just one gripper. For example, the opposite vertical support surface could be equipped with a rubber or neoprene strip, increasing frictional contact, allowing only one gripper to suspend groups of cards.

The elevator of a device with stationary grippers may then be moved to the next directed separation position, which would require, on average, less movement than having to reset the entire deck to the bottom of the card supporting area and then moving the picker, and then raising the picker to the card insertion point, as required in U.S. Pat. No. 5,683,085.

The microprocessor (not shown) controls and directs the operation of the shuffling and card verifying apparatus 102. The microprocessor also receives and responds to information provided to it. For example, a set of sensing devices, such as sensors 152, are used to determine the movement point of the elevator platform 156 that positions the top card in a set of cards (not shown) within the card mixing area 150 at a specific elevation. The sensors 152 identify when an uppermost card on the elevator platform 156 or the top of the elevator platform 156 itself is level with the sensors 152. This information is provided to the microprocessor. A reading system 170 may also be used to provide information, such as the number of cards that have been fed from the card accepting/receiving area 106 into the card mixing area 150, so that the number of cards shuffled and the number of cards present on the elevator platform 156 at any given time is known. This information, such as the number of cards present within the card mixing area 150, is used by the microprocessor, as later explained, to randomly arrange and thus shuffle cards according to the programming of the system.

For example, the programming may be performed as follows. The number of cards in a set of cards intended to be used in the system is entered into the memory of the microprocessor. Each card in the set of cards is provided with a specific number that is associated with that particular card, herein referred to as the "original position number." This is most conveniently done by assigning numbers according to positions within the original (unshuffled) set of cards. If cards are fed from the bottom of the stack into the randomizing apparatus, cards are assigned numbers from the bottom to the top. If cards are fed from the top of the stack or the front of a stack supported along its bottom edges, then the cards are numbered from top to bottom, or front to rear.

A random number generator (which may be part of the microprocessor, may be a separate component or may be external to the device) then assigns a random position number to each card within the original set of cards, the random position number being the randomly determined final position that each card will occupy in the randomly associated set of cards ultimately resulting in a shuffled set of cards. The microprocessor identifies each card by its original position number. This is most easily done when the original position number directly corresponds to its actual position in the set, such as the bottommost card being CARD 1, the next card being CARD 2, the next card being CARD 3, etc. The microprocessor, taking the random position number, then directs the elevator platform 156 to move into position where the card can be properly inserted into the randomized or shuffled set of cards. For example, a set of randomized positions selected by a random number generator for a single deck is provided below. OPN is the Original Position Number and RPN is the Random Position Number.

| OPN | RPN |
|---|---|
| 1 | 13 |
| 2 | 6 |
| 3 | 39 |
| 4 | 51 |
| 5 | 2 |
| 6 | 12 |
| 7 | 44 |
| 8 | 40 |
| 9 | 3 |
| 10 | 17 |
| 11 | 25 |
| 12 | 1 |
| 13 | 49 |
| 14 | 10 |
| 15 | 21 |
| 16 | 29 |
| 17 | 33 |
| 18 | 11 |
| 19 | 52 |
| 20 | 5 |
| 21 | 18 |
| 22 | 28 |
| 23 | 34 |
| 24 | 9 |
| 25 | 48 |
| 26 | 16 |
| 27 | 14 |
| 28 | 31 |
| 29 | 50 |
| 30 | 7 |
| 31 | 46 |
| 32 | 23 |
| 33 | 41 |
| 34 | 19 |
| 35 | 35 |
| 36 | 26 |
| 37 | 42 |
| 38 | 8 |
| 39 | 43 |
| 40 | 4 |
| 41 | 20 |
| 42 | 47 |
| 43 | 37 |
| 44 | 30 |
| 45 | 24 |
| 46 | 38 |
| 47 | 15 |
| 48 | 36 |
| 49 | 45 |
| 50 | 32 |
| 51 | 27 |
| 52 | 22 |

The sequence of steps in the shuffling or randomizing procedure may be described as follows for the above table of card OPN's and RPN's. OPN CARD 1 is carried from the card accepting/receiving area 106 to the final nip rollers or offset rollers 146. The final nip rollers or offset rollers 146 place CARD 1 onto the top of the elevator platform 156. The elevator platform 156 has been appropriately positioned by sensing by sensors 152. OPN CARD 2 is placed on top of CARD 1, without the need for any gripping or lifting of cards. The microprocessor identifies the RPN position of CARD 3 as beneath both CARD 1 and CARD 2, so the elevator platform 156 lifts the cards to the separation elements 154, which grip both CARD 1 and CARD 2, then supports those two cards while the elevator platform 156 retracts, allowing CARD 3 to be placed between the elevator platform 156 and the two supported cards. The two cards (CARD 1 and CARD 2) are then placed on top of CARD 3, supported by the elevator platform 156. The fourth card (CARD 4) is assigned position RPN 51. The elevator platform 156 would position the three cards in the pile so that all three cards would be lifted by the card separation element, and the fourth card inserted between the three cards (CARD 1, CARD 2 and CARD 3) and the elevator platform 156. The fifth card (CARD 5) has an RPN of 2, so that the apparatus 102 merely requires that the four cards be positioned below the insertion point from the final nip rollers or offset rollers 146 by lowering the elevator platform 156. Positioning of the sixth card (CARD 6) with an RPN of 12 requires that the elevator platform 156 raise the complete stack of cards, the sensors 152 sense the top of the stack of cards, elevate the stack of cards so that the separation elements 154 grip only the top two cards (RPN positions 2 and 6), lower the elevator platform 156 slightly, and then CARD 6 with an RPN of 12 can be properly inserted into an opening in the developing randomized set of cards. This type of process is performed until all 52 cards (for a single-deck game) or all 104 cards (for a double-deck game) are randomly distributed into the final randomized set or shuffled set of cards. The apparatus may be designed for groups of cards larger than single 52-card decks, including 52-card decks with or without special (wild cards or jokers) cards, special decks, two 52-card decks, and two 52-card decks plus special cards. Larger groupings of cards (e.g., more than 108 cards) may also be used, but the apparatus 102 of the first example of the invention has been shown as optimized for one- or two-deck shuffling.

Elevation of the elevator platform 156 may be effected by any number of commercially available systems. Motivation is preferably provided by a system with a high degree of consistency and control over the movement of the elevator, both in individual moves (e.g., individual steps or pulses) and in collective movement of the elevator (the steps or revolutions made by the moving system). It is important that the elevator be capable of providing precise and refined movement and repeated movements that do not exceed one card's thickness. If the minimum degree of movement of the elevator exceeds one card's thickness, then precise positioning could not be effected. It is preferred that the degree of control of movement of the elevator does not exceed at least one-half the card thickness. In this manner, precise positioning of the cards with respect to the separation elements 154 can be effected. Additionally, it is often desirable to standardize, adjust, or calibrate the position of the elevator (and/or cards on the elevator) at least once, and often at intervals, to ensure proper operation of the apparatus 102. In one example of the invention, the microprocessor calls for recalibration periodically, and provides the dealer with a warning or calibration instructions on the display 12 (FIG. 1).

As later described, a microstepping motor or other motor capable of precise, small and controlled movements is preferred. The steps, for example, may be of such magnitudes that are smaller than a card's thickness, such as, for example, individual steps of 0.0082 inch (approximately less than the thickness of a card), 0.0041 inch (less than one-half a card's thickness), 0.00206 inch (less than about one-quarter a card's thickness), 0.0010 inch (less than about one-eighth a card's thickness), 0.00050 inch (less than about one-sixteenth a card's thickness), 0.00025 inch (less than about one-thirty-second a card's thickness), 0.000125 inch (less than about one-sixty-fourth a card's thickness), etc.

Particularly desirable elevator control mechanisms would be servo systems or stepper motors and geared or treaded drive belts (essentially more like digital systems). Stepper motors, such as microstepper motors, are commercially available that can provide, or can be readily adjusted to provide incremental movements that are equal to or less than one card's thickness, including whole fractions of card thicknesses and indefinite percentages of card thicknesses. Exact correspondence between steps and card thickness is not essential, especially where the steps are quite small compared to the card thickness. For example, with a card thickness of about 0.279 mm, the steps may be 0.2 mm, 0.15 mm, 0.1 mm, 0.08 mm, 0.075 mm, 0.05 mm, 0.04 mm, 0.01 mm, 0.001 mm or smaller, and most values therebetween. It is most desirable to have smaller values, as some values, such as the 0.17 mm value of a step, can cause the gripper in the separation element to extend over both a target position to be separated and the next lower card in the stack to be gripped, with no intermediate stepping position being available. This is within the control of the designer once the fundamentals of the process have been understood according to the present description of the practice of the invention. As shown in FIG. 2, a drive belt 164 is attached to two drive rollers 166 which move the elevator platform 156. The belt 164 is driven by a stepper motor system 171 that is capable of 0.00129-inch (0.003-mm) steps.

Figure 3:
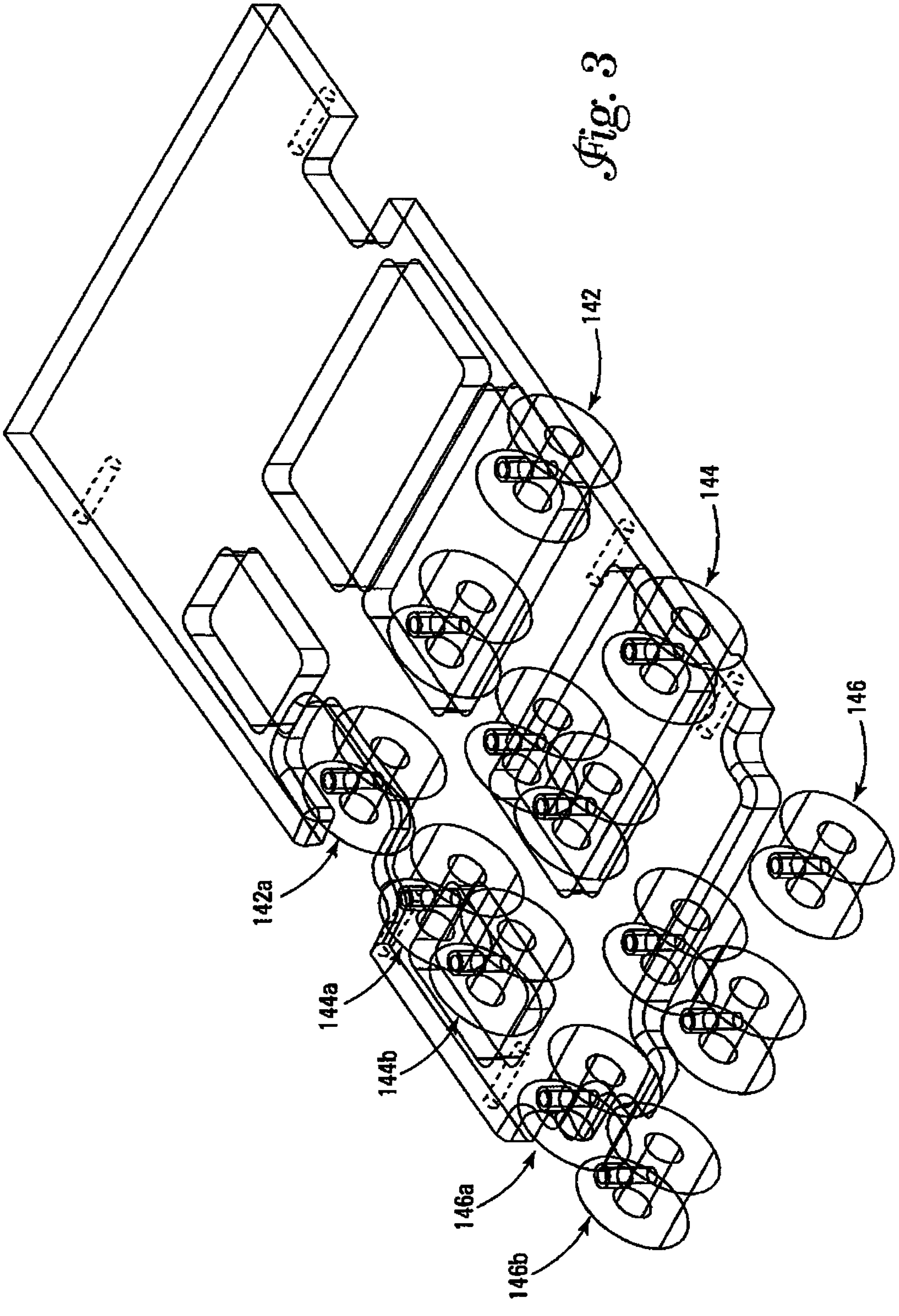
FIG. 3 shows a perspective view of an offset card transport mechanism according to an embodiment of the invention.

FIG. 3 shows a perspective cutaway of the sets of nip rollers or offset rollers 142, 144 and 146 of a first example of the invention. These are not truly sets of nip rollers, but are offset rollers, so that rollers 142*a* and 142*b* (not shown), 144*a* and 144*b*, 146*a* and 146*b* are not precisely linearly oriented. By selecting a nip width that is not so tight as to press a card from both sides of the card at a single position, and by selecting offset rollers rather than aligned nip rollers, fluid movement of the card, reduced damage to the card, and reduced jamming may be provided. This is a particularly desirable aspect of a preferred practice of the present invention, which is shown also in FIG. 4.

Figure 4:
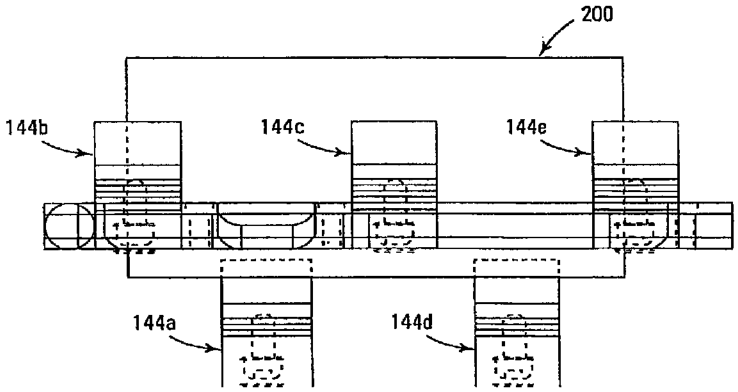
FIG. 4 shows a top view of an offset card transport mechanism according to an embodiment of the present invention.

FIG. 4 shows a set of offset rollers 144*a*, 144*b*, 144*c*, 144*d* and 144*e* transporting a card 200. The card 200 is shown passing over rollers 144*a* and 144*d* and under rollers 144*b*, 144*c* and 144*e*. As can be seen, the rollers are not capable of contacting a card to precisely overlap at a specific point on opposite sides of a card.

Figure 5:
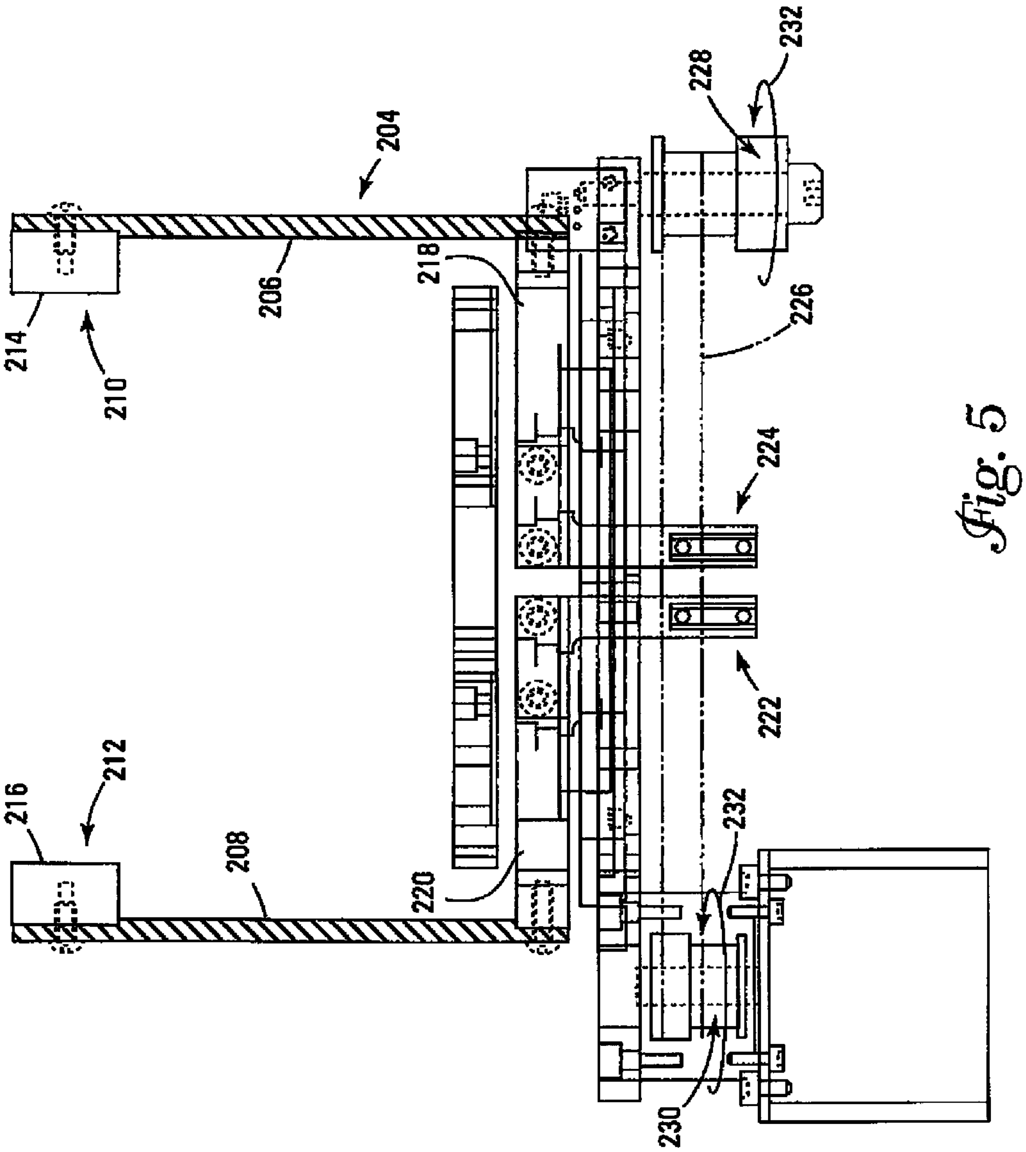
FIG. 5 shows a cross-sectional view of an embodiment of a picking system with a single or joint belt drive for moving picker elements.

FIG. 5 shows a cross-sectional view of one embodiment of a gripping system 204 that may be used in the practice of the invention. FIG. 5 shows two oppositely spaced support arms 206 and 208 that support gripping elements 210 and 212, which comprise semi-rigid gripping pads 214 and 216. These gripping pads 214 and 216 may be smooth, grooved, covered with high-friction material (e.g., rubber or neoprene), ribbed, straight, sloped, or the like, to take advantage of various physical properties and actions. The support arms 206 and 208 are attached to separately movable positioning arms 218 and 220. These positioning arms 218 and 220 are referred to as separately movable, in that they are not physically connected, but one tends to move from left to right while the other moves right to left (with respect to the view shown in FIG. 5) as the two positioning arms 218 and 220 move in and out (substantially horizontally) to grip or release the cards. However, preferably, they do not move independently, but should move in concert. It is also desirable that they are fixed with respect to the vertical. If the positioning arms moved completely independently (horizontally, during gripping), with only one at a time moving to attempt to contact the cards, the first contacting arm could move cards out of vertical alignment. For this reason, it is preferred that two opposed gripping arms be used.

Although the positioning arms 218 and 220 may not move the gripping pads 214 and 216 into contact with absolute precision, they should contact opposite edges of the cards at approximately the same time, without moving any card more than 5% of the length of a card (if contacted lengthwise) or 7% of the width of the card (if contacting the cards widthwise). An example of one mechanism for moving the positioning arms 218 and 220 in concert is by having a drive belt 226 that engages opposite sides of two connectors 222 and 224 that are attached to positioning arms 220 and 218, respectively. The belt 226 contacts these connectors 222 and 224 on opposite sides, such as contacting connector 224 on the rear side, and contact connector 222 on the front side. As the belt 226 is driven by rotors 228 and 230, with both rotors 228 and 230 turning in direction 232, connector 222 will be moved from left to right, and connector 224 will be moved from right to left. This will likewise move gripping pads 214 and 216 inwardly to grip cards. The use of such pads is much preferred over the use of rigid, pointed, spatula elements to separate cards, as these can damage cards, which not only increases the need for replacement, but can also mark cards, which could reduce security.

Alternative constructions comprise a flat elastic or a rubbery surface with knobs or nubs that extend upwardly from the surface to grab cards when pressed into contact with the sides of the cards. These elements may be permanently affixed to the surfaces of the pickers or may be individually removable and replaceable. The knobs and the flat surface may be made of the same or different materials, and may be made of relatively harder or softer, relatively rigid or relatively flexible materials according to design parameters.

The apparatus may also contain additional features, such as card reading sensor(s) (e.g., an optical sensor, a neural sensing network, a video imaging apparatus, a barcode reader, etc.) to identify suits and ranks of cards; feed means for feeding cards sequentially past the sensor(s); at various points within the apparatus; storing areas in which the cards are stored in a desired order or random order; selectively programmable artificial intelligence coupled to the sensor(s) and to the storing areas to assemble in the storing areas groups of articles in a desired order; delivery systems for selectively delivering the individual articles into the storing areas; and collector areas for collecting collated or randomized subgroups of cards.

The sensor(s) may include the ability to identify the presence of an article in particular areas, the movement or lack of movement in particular areas, the rank and/or value of a card, spurious or counterfeit cards and marked cards. This can be suitably effected by providing the sensor with the capability of identifying one or more physical attributes of an article. This includes the sensor having the means to identify indicia on a surface of an article. The desired order may be a specific order of one or more decks of cards to be sorted into its original pack order or other specific order, or it may be a random order into which a complete set of articles is delivered from a plurality of sets of randomly arranged articles. For example, the specific order may be effected by feeding cards from the card in-feed area, past a card reading area with a sensor identifying the suit and rank, and having a pre-established program to assign cards, based upon their rank and suit, into particular distributions onto the elevator platform. For example, a casino may wish to arrange the cards into pack order at the end of a shift to verify all cards are present prior to decommissioning, or may want to deal cards out in a tournament in a specified random order. The sensing can take place in the card receiving area when the cards are stationary, or while the cards are in motion.

The suit, rank and position of all cards in the card accepting/receiving area will then be known, and the program can be applied to the cards without the use of a random number generator, but with the microprocessor identifying the required position for that card of particular suit and rank. The card may also be read between the offset rollers or between the last offset roller and the platform, although this last system will be relatively slow, as the information as to the card content will be known at such a late time that the platform cannot be appropriately moved until the information is obtained.

For example, the desired order may be a complete pack of randomly arranged playing cards sorted from holding means which holds multiple decks, or a plurality of randomly oriented cards forming a plurality of packs of cards. This may be achieved by identifying the individual cards by optical readers, scanners or any other means, and then, under control of a computer means, such as a microprocessor, placing an identified card into a specific collector means to ensure delivery of complete decks of cards in the desired compartment. The random number generator is used to place individual cards into random positions to ensure random delivery of one to eight or more decks of cards, when desired, and depending on the size of the device.

In one aspect of the invention, the apparatus is adapted to provide one or more shuffled packs of cards, such as one or two decks for poker games or blackjack. According to another aspect of the invention, a method of randomizing a smaller or larger group of cards is accomplished using the device of the present invention. According to the invention, the method includes the steps of: 1) placing a group of cards to be randomized into a card in-feed tray; 2) removing cards individually from the card in-feed tray and delivering the cards into a card collection area, the card collection area having a movable lower surface and a stationary opening for receiving cards from the in-feed tray; 3) elevating the movable lower surface to a randomly determined height; 4) grasping at least one edge of a group of cards in the card collection area at a point just above the stationary opening; 5) lowering the movable lower surface to create an opening in a stack of cards formed on the lower surface, the opening located just beneath a lowermost point where the cards are grasped; and 6) inserting a card removed from the in-feed tray into the opening. According to the method of the present invention, steps 2 through 6 are repeated until all of the cards originally present in the in-feed tray are processed, forming a randomized group of cards.

As described above, the method and apparatus of the present invention can be used to randomize groups of cards, to sort cards into a particular desired order and to verify cards while maintaining an original card order. When sensing equipment is used to detect rank and suit of the cards, the cards can be arranged in any predetermined order according to the invention. It is to be understood that numerous variations of the present invention are contemplated, and the disclosure is not intended to limit the scope of the invention to the examples described above. For example, it might be advantageous to tip the card mixing area 150 (FIG. 2) slightly, such that a top portion is farther away from the card accepting/receiving area 106 than a bottom portion. This would assist in aligning the stack vertically in card mixing area 150 and would increase the efficiency and accuracy of the randomization or ordering process. In one preferred embodiment, the card mixing area 150 is tipped between 3 degrees and 8 degrees from the vertical.

Figure 6:
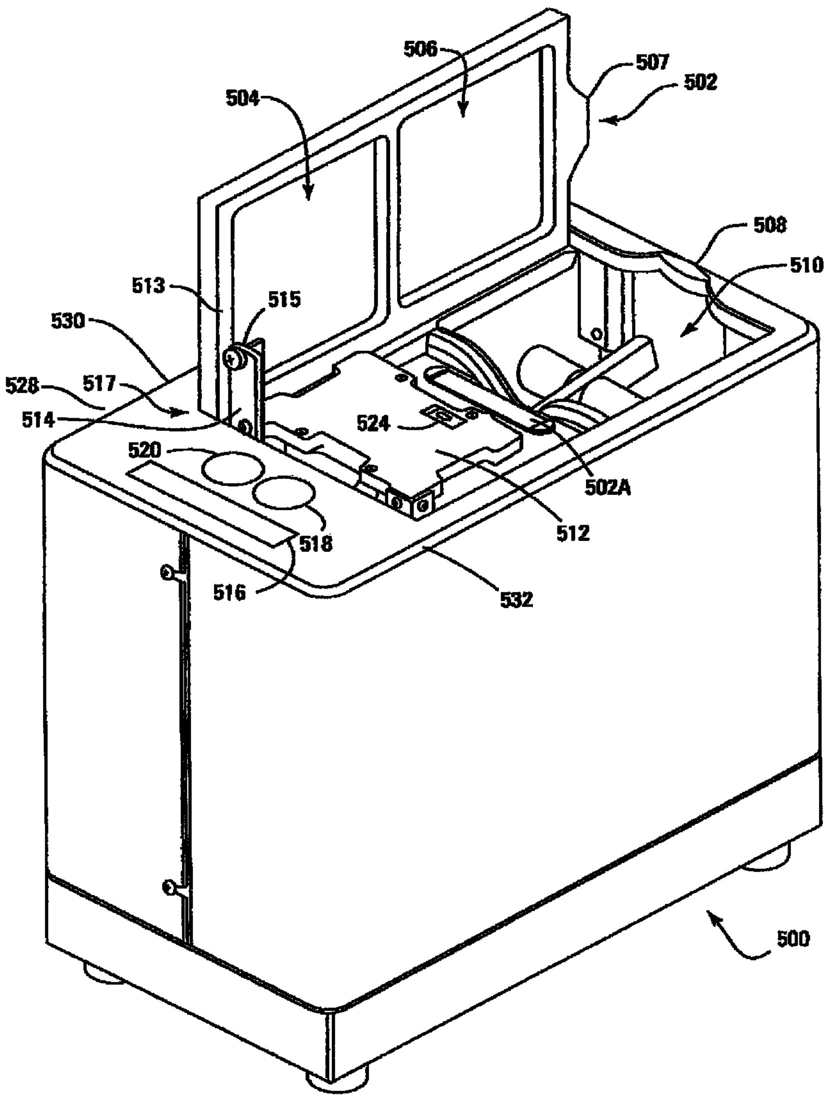
FIG. 6 shows an elevated perspective view of one embodiment of a shuffling apparatus according to the invention.

In another embodiment of the invention, the shuffler is flush-mounted into the top surface of a gaming table such that in-feed tray or card accepting/receiving area 106 is recessed beneath the top surface of the gaming table, and a lower horizontal surface of the elevator platform 156 in the delivery area or shuffled card return area 132 in its upright position is flush with the elevation of the gaming table surface. It would be particularly advantageous to also provide a flush-mounted, retractable carry handle 502A, as shown in FIG. 6, that can be used to lift a flush-mounted card handler out of the opening in the card table in order to replace or service the device. The handle 502A lifts upwardly and terminates with stops (not shown) that prevent the handle 502A from exiting the top surface of the device. When the device is in use, the handle 502A is flush-mounted into the surface in which it is attached. In another example of the invention, the handle 502A is flush-mounted into an upper surface of the device.

Although the machine can sit on the tabletop, it is preferably mounted on a bracket having a support surface located beneath the gaming table surface, and is completely surrounded by the table top, enabling a dealer to obtain and return cards without undue lifting above the surface of the gaming table. In one embodiment, the entire shuffler is mounted into the gaming table such that the in-feed tray and card return areas are either flush or approximately flush with the gaming table surface. Such an arrangement would be particularly suited for use in conventional poker rooms.

In a second example of the invention, the device is configured to process larger groups of cards, such as a stack of eight complete decks. The individual components operate in much the same manner, but the specific configuration is designed to accommodate the greater height of the stack.

FIG. 6 shows a vertical perspective view of another apparatus 500 according to the invention. The apparatus 500 is shown with a flip-up cover 502 with sections 504 and 506 that overlie an elevator platform 512 and a card insertion area 510. An extension or tab 507 is provided to nest into open area 508 to assist lifting of the flip-up cover 502 when needed. The open area 508 leaves some additional space for a finger or tool to be inserted against the extension 507 to assist in its lifting. That additional space may be designed to accommodate only a tool so as to reduce any possibility of a player readily opening the shuffling apparatus 500. In a preferred embodiment of the invention, there is provided an arm extension 514 of the elevator platform 512 that contacts an internal edge 513 of the flip-up cover 502, here with a roller 515 shown as the contact element, to lift the flip-up cover 502 when the elevator platform 512 rises to a level where cards are to be removed, the extension 514 forcing the flip-up cover 502 to lift from a top surface 517 of the apparatus 500. The extension 514 also will buffer playing cards from moving as they are lifted from the elevator platform 512, although additional elements (not shown) may be used to restrain movement of the cards when elevated to a removal level. In this example of the invention, side panels are not used to stabilize the stack of delivered cards.

FIG. 6 also shows a display panel 516, which may be any format of visual display, particularly those such as LED panels, liquid crystal panels, CRT displays, plasma displays, digital or analog displays, dot-matrix displays, multi-segment displays, fixed-panel multiple-light displays, or the like, to provide information to a viewer (e.g., dealer, casino personnel, etc.). The display panel 516 may show any information useful to users of the apparatus 500, and show such information in sufficient detail as to enable transfer of significant amounts of information. Such information might include, by way of non-limiting examples, the number of cards present in the apparatus, the status of any shuffling or dealing operations (e.g., the number of complete shuffling cycles), hand information (such as the number of hands to be dealt, the number of hands that have been dealt, the number of cards in each hand, the position to which a hand has been dealt, etc.), security information (e.g., card jam identification, location of card jams, location of stuck cards, excess cards in the container, insufficient cards in the container, unauthorized entry into the apparatus, etc.), confirmation information (e.g., indicating that the apparatus is properly corresponding to an information-receiving facility, such as a network or microprocessor at a distal or proximal location), on/off status, self-check status, and any other information about play or the operation of the apparatus that would be useful. It is preferred that the display panel 516 and the software driving the display panel 516 be capable of graphics display, not merely alphanumeric.

Buttons 518 and 520 can be on/off buttons, special function buttons (e.g., raise elevator to the card delivery position, operate jam sequence, reshuffle demand, security check, card count demand, calibrate, etc.), and the like. A sensor 524 (e.g., optical sensor, pressure sensor, magnetic detector, sonar detector, etc.) is shown on the elevator platform 512 to detect the presence of cards or other objects on the elevator platform 512.

Figure 7:
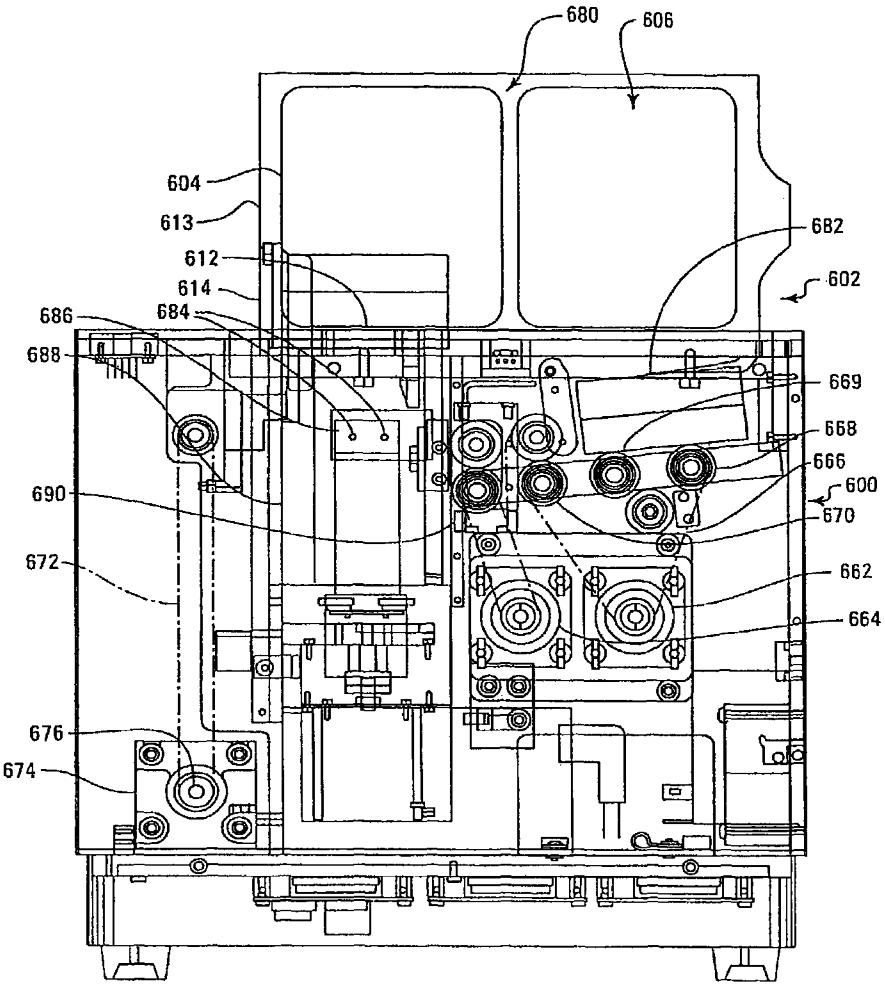
FIG. 7 shows a side cutaway view of one embodiment of a shuffling apparatus according to the invention.

FIG. 7 is a side cutaway view of an apparatus 600 according to an aspect of the invention, which may be compared with FIG. 2 to provide an explanation of components and some of the variations possible within the practice of the invention. For example, the use of two belt drive motors 662 and 664 versus the three shown in FIG. 2 allows for the apparatus 600 to be shortened, with motor 662 driving a belt 666 that moves three rollers 668, 669 and 670. The pair of rollers 144 is removed from this example of the invention as superfluous. The two drive rollers 166 in FIG. 2 that raise the elevator platform 156 are partially eliminated by having an elevator drive belt 672 driven by a motor 674 and an attached spindle 676, which have been positioned in direct alignment with the drive belt 672 in FIG. 7, instead of the right-angle, double-belt connection shown in FIG. 2. Again, as the drive belt 672 moves far enough to display cards (not shown) on an elevator platform 612, an extension 614 presses against an edge 613 of a cover section 604, elevating a cover top 602. The apparatus 600 is actually preferably configured with sections 604 and 606 separated along area 680 so that they move independently. By separating these sections 604 and 606, only the cards readied for delivery are exposed, and access to area 682 where unshuffled cards are to be inserted is more restricted, especially where, as noted above, a tool or implement is needed to raise the cover section corresponding to 606 so that the unshuffled cards may not be too readily accessed.

In FIG. 7, the motors 662, 664 and 674 are preferably highly controlled in the degree of their movement. For example, one of the methods of providing precise control of motor movement is with microstepped motors. Such microstepping of motors controls the precise amount of movement caused by the motor. This is especially important in motor 674 that drives the elevator platform 612 that in turn carries the cards (not shown) to be separated for random card insertion. With microstepping, the movement of the cards can be readily controlled to less than a card thickness per microstep. With such control, with movements per microstep of no more than 0.9 a card's thickness, preferably less than 0.8 a card's thickness, less than 0.5 a card's thickness, less than 0.4 a card's thickness, less than ⅓ a card's thickness, less than 0.25 a card's thickness, less than 0.20 a card's thickness, and even less than 0.05 a card's thickness, much greater assurance of exact positioning of the elevator platform 612 and the cards thereon can be provided, further ensuring that cards will be inserted exactly where requested by operation of the microprocessor. Sensing elements 684 may be positioned within a picker or grabbing element 686 to analyze the position of the picker 686 with respect to cards being separated to determine if cards have been properly aligned with the picker 686 and properly separated. The picker 686 may alternatively be physically protruding sub-elements that grab small areas of cards, such as rubber or elastomeric bumps, plastic bumps, metal nubs, or the like. Sensors may alternatively be placed on other surfaces adjacent the picker 686, such as walls 688 or 690 or other adjacent walls or elements. For increased security and enhanced performance, it is preferred that multiple sensors be used, preferably multiple sensors that are spaced apart with regard to edges of the cards, and multiple sensors (i.e., at least two sensors) that are positioned so that not only the height can be sensed, but also misalignment or sloping, or bending of cards at different locations or positions. The sensors can work independently of or in tandem with the microprocessor/step motor/encoder operation.

The microstep motors will also assist the apparatus in internal checks for the correct position. For example, an encoder can be used to check the exact position of the elevator with regard to the measured movement and calculation of the precise movement of the elevator platform and hence the cards. The encoder can evaluate the position of the elevator platform through analysis and evaluation of information regarding, for example, the number of pulses per revolution of the spindle 676 on the motor 674, which may be greater than 100 pulses per revolution, greater than 250 pulses per revolution, greater than 360 pulses per revolution, greater than 500 pulses per revolution or greater than 750 pulses per revolution, and, in preferred embodiments, greater than 1000 pulses per revolution, greater than 1200 pulses per revolution, and equal to or greater than 1440 pulses per revolution. In operation, the microprocessor moves the motor, the encoder counts the amount of movement driven by the motor, and then determines the actual position of the elevator platform or a space (e.g., four cards higher) relative to the elevator platform. The sensors may or may not be used to determine the correct position, initially calibrate movement and sensing positions on the platform, or as a security check.

An additional design improvement with respect to the apparatus 102 of FIG. 2 and that of the apparatus 600 of FIGS. 6 and 7 is the elimination of a staging area in the apparatus design of FIG. 2. After a card (not shown) in FIG. 2 passes from rollers 142 to rollers 144, but before being passed to rollers 146, the card would be held, or stated, by rollers 144. This can be eliminated by the design of rollers 668, 669, and 670 shown in FIG. 7, with the movement of the cards timed to the movement of the elevator platform 512, 612 and the separation of the cards by the pickers 686.

The apparatus 500 shown in FIG. 6 is also provided with an outer flange 528 extending around an upper edge 530, 532 of the top surface 517 of the apparatus 500 that may be used to attach and support the apparatus 500 to a table or to support the apparatus 500 so that the top surface 517 is relatively parallel to the surface of the table.

The use of a shuffler whose shuffling mechanism is concealed completely beneath the gaming table surface potentially poses security issues to a casino. In the event of a system malfunction, the dealer might not be aware that a shuffling sequence has failed. Since there is no way to visualize the shuffling routine, and in order to avoid instances where the display lights may malfunction and erroneously show a shuffling sequence has been completed, an added level of security has been provided to the shuffler of the present invention.

According to the present invention, in the shuffling or shuffling and verifying modes, a number of cards to be randomized and the order of insertion of each card into the card randomizing or shuffling compartment is predetermined by the random number generator and microprocessor. By adding an encoder to the motor or motors driving the elevator, and by sensing the presence of groups of suspended cards, the MPU can compare the data representing the commands and the resulting movements to verify a shuffle has occurred. In the absence of this verification, the shuffler can send a signal to the display to indicate a misdeal, to a central pit computer to notify management of the misdeal, to a game table computer (if any) with an output display to notify the dealer of a misdeal, to a central computer that notifies security, to a central system for initiating maintenance calls, or to combinations of the above.

Such a system is referred to as a "closed loop" system because the MPU creates the commands and then receives system signals verifying that the commands were properly executed.

Although the dealer control panel and display in the above examples of the present invention are located on the card shuffler, the present invention contemplates user-operated remote controls, such as a foot pedal, an infra-red remote control, the input of commands from a remote keyboard in the pit, or other device initiated by a dealer or by management. Unlike the shuffler operation driven by software from a game computer, pit computer or central computer system, the shuffler of the present invention is controllable by an operator using remote equipment such as what is described above.

Although the randomizing system has been described as a vertically disposed stack of cards with a means for gripping a portion of the cards, and lowering the remaining cards to form two separate subgroups, forming an insertion point, the invention contemplates the use of a shuffler with a carousel-type card collection area. The gripping pads in this example of the invention grip a portion of cards that are horizontally disposed, and the card collection area rotated to create an insertion point for the next card. The cards are pushed out one at a time, or in groups to a card collection area.

Figure 8:
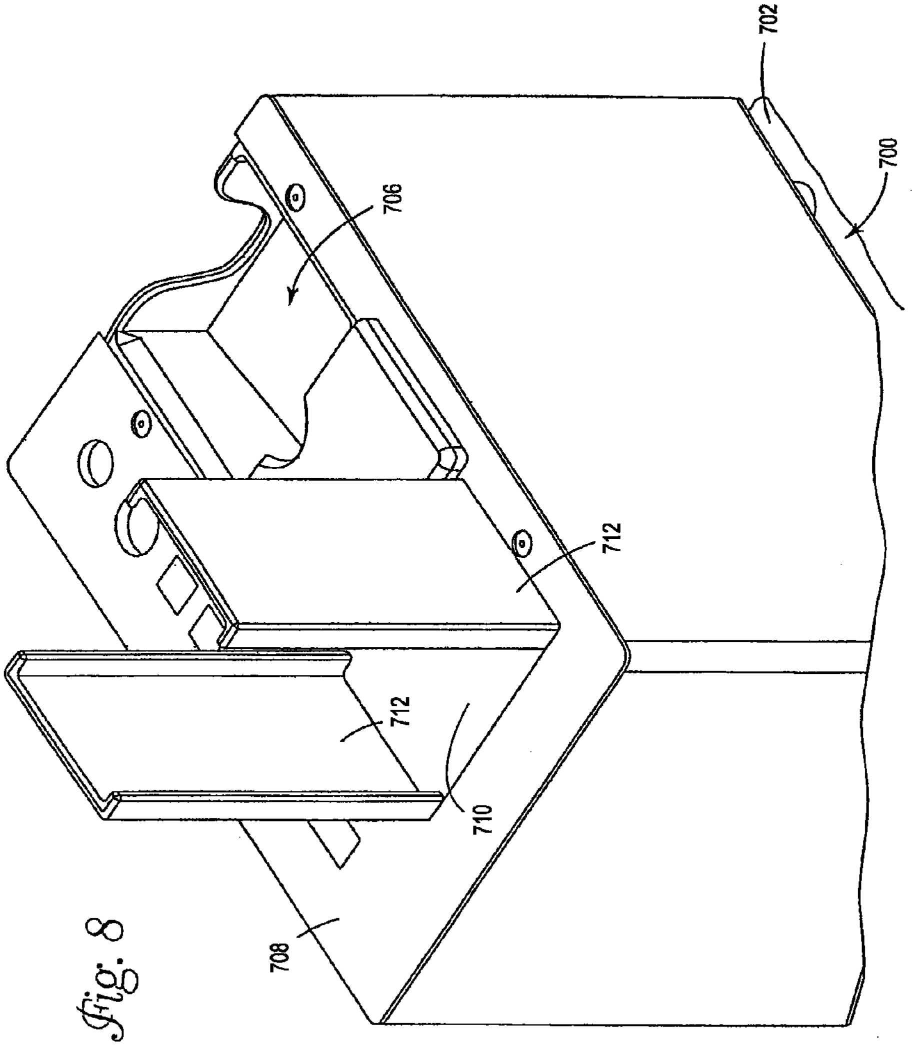
FIG. 8 shows a perspective view of a second example of an exterior shell of a shuffling apparatus of the present invention.

Referring now to FIG. 8, a perspective view of a shuffling machine 700 of the present invention is shown mounted to a shuffler support plate 702 behind a gaming table (not shown) that may or may not be modified to accommodate placement of the support plate 702.

In this example of the invention, cards are loaded into an in-feed tray 706. In one example of the invention (not shown), the lower surface of the in-feed tray 706 is substantially horizontal and is provided so that cards can be loaded into a top surface 708 of the shuffling machine 700, and then lowered beneath the gaming table surface for randomization.

The in-feed tray 706 may be equipped with a card support structure similar to the vertical support structure 712 surrounding delivery tray 710, which, in a preferred embodiment, has two vertical supports and two sides left open. Cards may be loaded into the in-feed tray 706 and into a card support structure (not shown), and lowered automatically in response to the dealer pushing downwardly on the top of the stack of cards or upon a signal received from the dealer controls (not shown).

In this example of the invention, the loading station is positioned near the playing surface (for example, a casino table) and at the dealer's side, allowing the machine to be used without unnecessary strain or unusual physical movement on the part of the dealer. Loading and unloading large stacks of cards from the top of a machine that is mounted to eliminate lifting, straining or reaching large distances addresses a need long felt in the industry for a more ergonomically friendly card shuffler.

The delivery tray 710 in the second described embodiment also includes a two-sided vertical support structure 712 for supporting a group of randomized cards as the cards are raised to the top surface 708 of the shuffling machine 700. It is to be understood that the vertical support structures 712 are preferably secured to the delivery tray 710, but could also be secured to the frame, and attached in a manner to pop up into position when needed.

A method of handling cards is described, including inserting the cards into a card in-feed tray, feeding the cards into a card randomization apparatus, capturing the randomized cards in a support structure and raising the cards and support structure to an upper surface of the shuffler. The method may comprise providing a retractable support structure for extracting shuffled cards, inserting shuffled cards into the support structure while it is below the top surface of the device, moving the support structure to expose the cards and retracting the support structure both before and after card removal. The card in-feed tray may also be positioned on an elevator capable of lowering the group of cards into the apparatus prior to shuffling. When a second elevator is used, it is preferable to provide a retractable support structure for supporting the cards as the cards are lowered for shuffling.

The method preferably includes providing two separate support structures that support a vertically stacked group of cards on at least two surfaces, and preferably three. The support structure can be a solid three-sided box, could consist of three vertically disposed bars, two parallel plates and two angle irons to retain corners, any other structure that keeps the stack in vertical alignment, or any other suitable support structure. The structure can be fixed to the upper surface of the shuffler, can be fixed to the elevators or can be affixed to the frame of the shuffler and constructed to "pop up" when needed for card loading and unloading. Cover plates, such as hinged or rotating plates, can be provided over the two elevators to provide additional cover (e.g., dust cover and visual cover) over the card source and the card collection areas to ensure that visual inspection of the shuffling procedure can be reduced, and entry of foreign materials can be reduced. The cover plates should be light enough for the system to automatically lift the covers or for a dealer to easily lift the covers manually. The cards themselves may push up the cover plates, or a preceding post or element can be positioned on the elevator or supports attached or moving conjointly with the elevators to press against the interior surface of the cover plates to lift the plates in advance of contact with the cards.

The card reading capability, as described in greater technical detail later, can be used in a different number of modes and positions to get the benefits of the present invention. The card reading capability (by some visual data-taking element, such as a camera, scanner, reflection scanner, image bit recorder, image edge detector, or any other subcomponent that can image a card or convert a visual image of the card into reproducible data) can be located at various positions within the shuffler where it can be assured of imaging each card before it is removed from the shuffler. This preferably is being done in the present invention internally in a shuffling machine where cards are not removed one at a time from a dealing end or fed as hands or groups of cards (but less than the entire set of cards) to be removed in a subgroup of the entire set of cards placed into the shuffler. In one example of the invention, a video camera is used as a rank/suit scanner.

A desirable set of image capture devices (e.g., a CCD automatic camera) and sensors (e.g., light-emitting devices and light capture devices) will be described, although a wide variety of commercial technologies and commercial components are available. A preferred camera is the DRAGONFLY™ camera, provided by Point Grey Research, Inc., and includes a six-pin IEEE-1394 interface, asynchronous trigger, multiple frame rates, 640×480 or 1024×724 24-bit true color or 8-bit grayscale images, image acquisition software and plug-and-play capability. This can be combined with commercially available machine vision software. The commercially available machine vision software is trained on card symbols and taught to report image patterns as specific card suits and ranks. Once a standard card suit/rank recognition program has been developed, the training from one format of cards to another becomes more simply effected and can be done at the casino table or by a security team before the shuffler is placed on the table. Position sensors can be provided and enhanced by one of ordinary skill in the art from commercially available components that can be fitted by one ordinarily skilled in the art. For example, various optics such as SICK® WT2S-N111 or WL2S-E111, OMRON®EE-SPY302, or OPTEK® OP506A, may be used. A useful encoder can be purchased as US Digital encoder 24-300-B. An optical response switch can be provided as MicroSwitch SS541A.

The benefits of the present system may be used in other types of shuffling devices, including continuous shufflers, especially where the continuous shufflers monitor the position of cards in the shuffled set from which cards are removed for play of a game, so that a constant inventory of the number, suit, rank and position of each and all cards can be maintained. Numerous types of image data-taking devices or image capture devices that can provide the image data necessary to "read" the symbols on the card sufficiently so as to distinguish individual card's rank at least by rank and preferably by rank and suit (and any other special markings that may be present on cards for special games) are available or are readily within the skill of the artisan to be constructed. Such image capture devices may be continuous (rapid frame-by-frame) video cameras, digital cameras, analog cameras, reader/scanners, edge response detectors, reflectance readers, and the like, and may optionally have lighting elements (for example, filament lighting, light-emitting diodes, lamps, electromagnetic spectrum emitters of any type, and the like) present to improve the lighting during image capture. The cards can be read during the randomization or verification procedures either when the cards are stationary or in motion, without any special stop positions or delays in the movement of cards. The cards are read in such a manner that the rank and suit of each card in a complete set of cards (e.g., all of the cards within the device) are identified in a randomized set by position of each card and the rank and suit of each card in each position. It is also important to note that, in a shuffling mode, the final set of cards is a randomized set of cards and not merely a collection of cards in a slightly different order from an original set of cards (e.g., previously played, unshuffled, hand-mixed, or the like). In another mode, cards are passed through the scanner without being shuffled for the purpose of rapidly verifying the content of the deck. One possible way of distinguishing a randomized deck of cards from a merely mixed deck or programmed collection of cards would be to use a statistical analysis program, or using another criteria, such as where fewer than 100% of the cards in a final set of at least 52 cards are not within ten cards' distance from adjacent cards within an original set.

As a general statement, the card reading capability should be directed towards a face of the cards so that edge reading (which requires specially marked cards) is not practiced or required. To do this, the camera or other image data-taking element should view at least a symbol-marked corner of a card. This is not a problem, as standard cards have their symbols (or suit and rank) in opposite corners so that rotating a card will leave the symbol in the same corner position for viewing. Given this background, the image data-taking component (hereinafter, an "IDC," or alternatively referred to as an image capture device) could be located as follows. If there is a feeding mechanism that moves individual cards from a deck or set of initial cards (usually unshuffled or previously used in a non-intended order) into a preliminary position before shuffling, the IDC could be located below the insertion area of the cards so that the bottom card is read before removal and, after each bottom card is read, the next bottom card is exposed to the IDC and is read. If top cards are removed one at a time, then each top card as it is moved would be read from below by an IDC. This is less preferred, as the IDC would be probably be maximally distanced from each card as it is read because of the height of the set of cards. The set of cards could be elevated to fix the IDC at an intermediate height to lessen this problem, but increased distance between the IDC and the cards would require better and more expensive optics and software.

If the set of cards is placed on a support and cards are removed one at a time from the bottom (preferably) or the top of the set of cards and moved directly into a shuffling operation (rather than stored, collected or buffered at this point), then the camera may be either directly below a transparent support (or exposed through a hole in the support) or at a position outside of a dimension of the set of cards (e.g., if in a vertical stack that forms a box-like structure, outside of the area of the bottom of the box), such as at an opening between an initial card support area and away from pick-off rollers or other first card moving elements within that area of the bottom, before a first set of rollers that exerts control over the card from the first card moving elements (e.g., braking rollers, speed-up rollers, nip rollers with any function, vacuum support movers, etc.), or after the first set of rollers exerts control over the card from the first card moving elements. The first card moving elements and all other card moving elements (except where otherwise specified) shall be discussed as rollers (usually nip rollers, although the pick-off rollers are not a set of nip rollers), such as pick-off rollers, for simplicity, it being understood that other card moving systems (e.g., plunger, pushing plates, etc.) may be used.

The card value (e.g., suit and/or rank) may be read after the first set of pick-off rollers, after the first set of nip rollers past the pick-off rollers, after a third set of rollers that exerts some control on the movement of cards after the first set of nip rollers, such as when (in the preferred structure of the invention) cards are individually moved from a set of rollers to be inserted into a space between subgroups of cards in a forming stack of shuffled/randomized cards. In those positions, with the cards moving face down within the shuffling device, the face of the cards can be readily observed by an IDC and an image taken.

Figure 9:
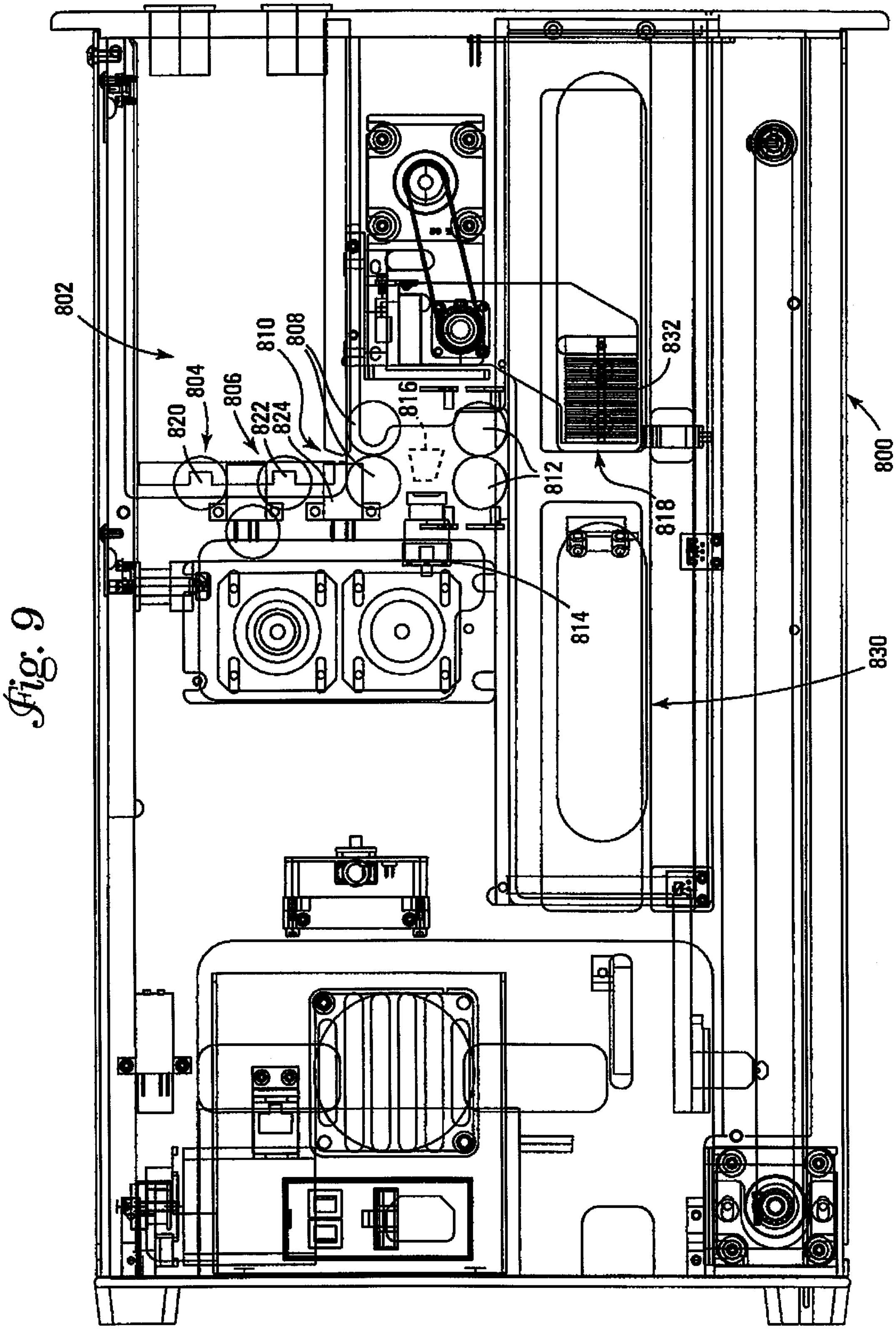
FIG. 9 shows a side cutaway view of one embodiment of a shuffling apparatus with card-reading camera available.

Looking at FIG. 9, a shuffling/randomizing device 800 is shown with an initial card set receiving area 802. A set of pick-off rollers 804 and 806 are shown. The pick-off rollers (shown as two rollers 804 and 806, but one, two, three or more linearly aligned or arrayed rollers can be used) move a card (not shown) from the bottom of a set of cards (not shown) placed into the initial card set receiving area 802 and through an access hole or slot 810 to a position where a second set of rollers 808 exert some control over the card exiting from the slot 810. As the card is moved past rollers 808 (which may be called braking rollers for convenience, or speed-up rollers, or any other term used in the jargon of the art), the face of the card with symbols thereon (not shown) is brought into focal area 816 where a camera 814 (or other IDC) may record the image of the face of the card. The card, at this time or subsequently, also has control exerted upon it by a next set of nip rollers 812, usually referred to as speed-up rollers, as they may sometimes desirably be used with linear surface speeds slightly greater than the linear surface speed of the rollers 808. Certain of the individual rollers in roller pairs may be brake rollers, free-turning rollers, or even stationary (not rotating) rollers to provide optional physical effects on the movement of and tension on cards. The rollers 812 move the card (not shown) into an insertion space 818, which will be in an opening created either above an elevator space 830 and collected cards (in the case of the verification mode) or between subgroups of cards (not shown) within elevator space 830 (in the case of the shuffling mode). The shuffling operation itself will be explained in greater detail later herein.

As noted elsewhere, the IDC may operate in a continuous “on-mode” (less preferred, primarily because of the volume of data that is produced, but the use of data screening or filtering software that concentrates on symbol imagery, as by only including data following light background to dark background changes, may be used) or in a single screen-shot mode that is timed to the proper positioning of the symbol on the card in the focal area of the camera. Looking again at FIG. 9, this can be seen and accomplished in a number of different ways. The time in which the various rollers 804, 806, 808 and 812 move the card from the initial card set receiving area 802 into the camera focal area 816 is quite consistent, so a triggering mechanism can be used to set off the camera 814 at an appropriate time when the card face is expected to be in the camera focal area 816. Such triggers can include one or more of the following, such as optical position sensors 820 and 822 within the initial card set receiving area 802, an optical sensor 824, a nip pressure sensor (not specifically shown), but which could be within either nip roller 808, and the like. When one of these triggers is activated, the camera 814 is instructed to time its shot to the time when the symbol-containing corner of the card is expected to be positioned within the camera focal area 816. The card may be moving at this time and does not have to be stopped. The card may be stopped if desired or if time is needed for supported cards 832 to be moved to allow insertion of a card into the insertion space 818 between subgroups of cards. The underlying function is to have some triggering in the shuffling/randomizing device 800 that will indicate with a sufficient degree of certainty when the symbol portion of a moving or moved card will be within the camera focal area 816.

Figure 10:
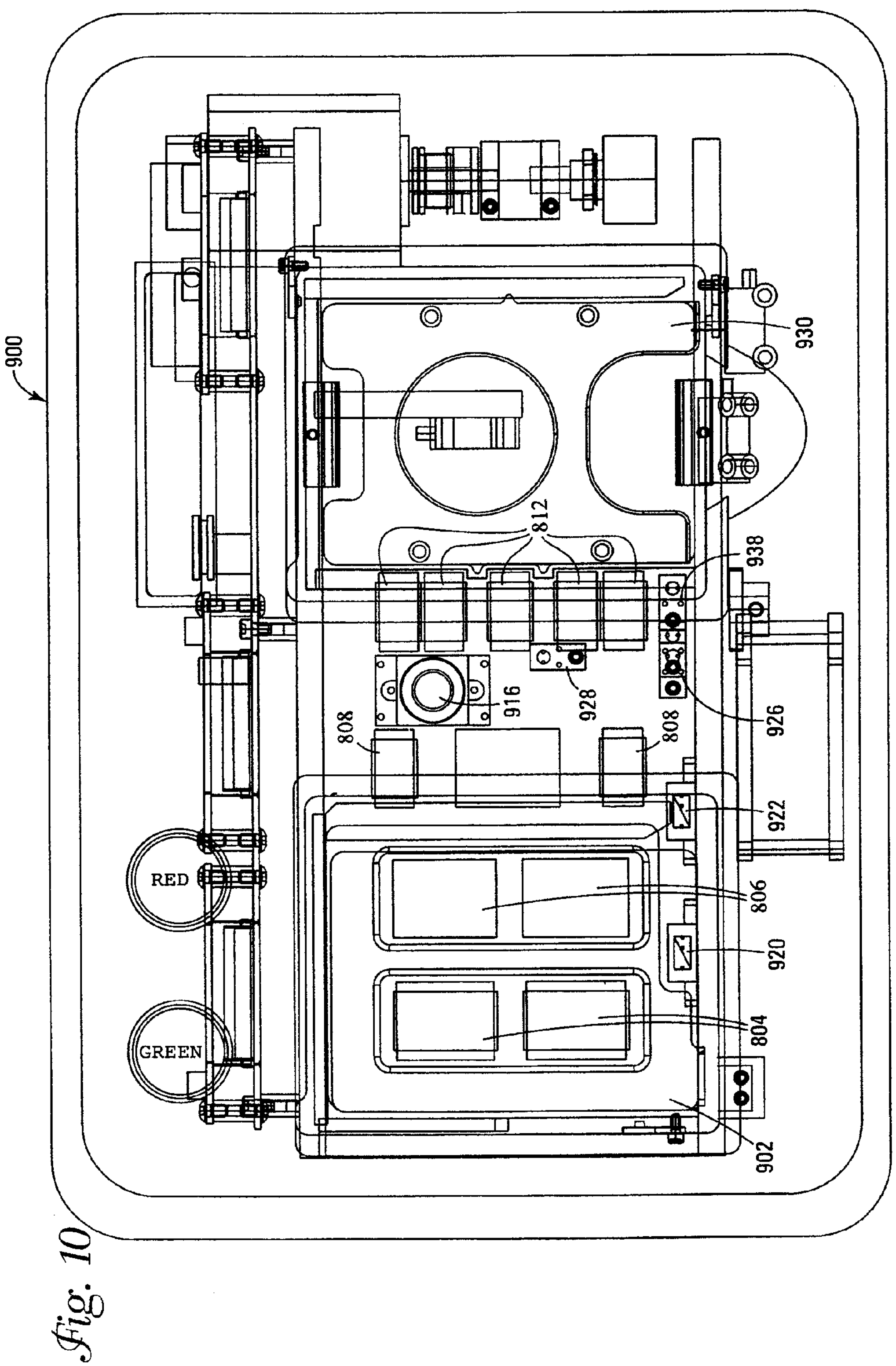
FIG. 10 shows a top cutaway view of another embodiment of a shuffling apparatus with card-reading camera available.

FIG. 10 shows a top cutaway view of a shuffler 900 with card reading camera 916 therein. The various elements are shown in a different view, such as pick-off rollers 804 and 806 and intermediate rollers 808 within an initial card set receiving area 902. Sensor 920 is shown in FIG. 9 as a card set sensor 920 that indicates that there are still cards in the initial card set receiving area 902. Sensor 928 is in a more favorable card sensing position to act as a trigger for the camera 916. A set of sensors 922 and 926 operate as card position sensors to check for jamming, clearance, alignment, and in-feed availability (into an elevator area 930). Sensors 938 and 926 may also act to ensure that a card to be fed into the elevator area 930 is properly positioned and available to be inserted by insert rollers 812.

A desirable set of image capture devices (e.g., a CCD automatic camera) and sensors (e.g., light-emitting devices and light capture devices) will be described, although a wide variety of commercial technologies and commercial components are available. A preferred camera is the DRAGONFLY® camera provided by Point Grey Research, Inc., and includes a six-pin IEEE-1394 interface, asynchronous trigger, multiple frame rates, 640×480 or 1024×724 24-bit true color or 8-bit grayscale images, image acquisition software and plug-and-play capability. This can be combined with commercially available machine vision software. The commercially available machine vision software is trained on card symbols and taught to report image patterns as specific card suits and ranks. Once a standard card suit/rank recognition program has been developed, the training from one format of cards to another becomes more simply affected and can be done at the casino table or by a security team before the shuffling and verifying apparatus 2 (FIG. 1) is placed on the table. Position sensors (e.g., sensors 32 and 34 of FIG. 1) can be provided and enhanced by one of ordinary skill in the art from commercially available components that can be fitted by one ordinarily skilled in the art. For example, various optics such as SICK® WT2S-N111 or WL2S-E111, OMRON® EE-SPY302, or OPTEK® OP506A may be used. A useful encoder can be purchased as US Digital encoder 24-300-B. An optical response switch can be provided as MICROSWITCH™ SS541A.

Once the symbol has been imaged, a signal is sent, preferably to an external processor or, less preferably, to the internal device microprocessor where the information of the suit and rank of the individual cards is processed according to the objectives of the system. After each card has been read, the individual cards are moved by rollers to be deposited in a card collection area. Cards are delivered into the card collection area by being placed on a support tray. The trigger may also activate a light that is used in conjunction with the image capture device to improve image capture capability. The signals corresponding to the read values are compared to stored values and the processor determines if extra cards are present or if cards are missing. The processor can also display additional information, such as the number of unknown cards. Unknown cards are cards that the machine cannot read and then match to a stored value. Nonlimiting examples of "unknown cards" can include upside-down cards, jokers (for games that do not allow jokers), promotional cards, cut cards, a different manufacturer's card, etc. A display could be provided in the form of a monitor, a sign or a printed report identifying missing cards, extra cards, a verified signal and any other information requested by the casino.

Another aspect of the invention is to provide a device for forming a random set of playing cards. The device may comprise:

- a top surface and a bottom surface of the device;
- a single card receiving area for receiving an initial set of playing cards;
- a randomizing system for randomizing the order of an initial set of playing cards;
- a single card collection surface in a card collection area for receiving randomized playing cards one at a time into the single card collection area to form a single randomized set of playing cards, the single card collection surface receiving cards so that all playing cards from the initial set of playing cards are received below the top surface of the device;
- an image capture device that reads the rank and suit of each card after it has begun leaving the single card receiving area and before being received on the single card collection surface; and
- access for removal of a single randomized set of playing cards as a complete set.

The access allows the complete set of randomized cards to be removed as a batch from the randomization device, rather than feeding the cards one at a time to a delivery end (e.g., shoe end) of the device. This can allow the device to be more compact and allow the device to operate independent of card delivery and in a batch manner as opposed to a continuous shuffler manner.

All of the apparatus, devices and methods disclosed and claimed herein can be made and executed without undue experimentation in light of the present disclosure. While the apparatus, devices and methods of this invention have been described in terms of both generic descriptions and preferred embodiments, it will be apparent to those skilled in the art that variations may be applied to the apparatus, devices and methods described herein without departing from the concept and scope of the invention. More specifically, it will be apparent that certain elements, components, steps, and sequences that are functionally related to the preferred embodiments may be substituted for the elements, components, steps, and sequences described and/or claimed herein while the same or similar results would be achieved. All such similar substitutions and modifications apparent to those skilled in the art are deemed to be within the scope and concept of the invention as defined by the appended claims.

The unique combination of the accurate imaging reading capability of the present system and the specific positioning capability and recording (indexing) of specific cards whose value (rank and suit) can be specifically identified and associated with a specific position with the final randomized set of cards, provides excellent security to casinos and players. As the card sequences in the shuffled set of final cards can be exactly known, this information can be used along with other security devices, such as table card reading cameras, discard trays with card reading capability, and the like, to add a high degree of certainty that a fair and honest game is being played at a specific location. Special bonus hands in games such as LET IT RIDE® poker, THREE CARD POKER® game, CRAZY 4 POKER®, and the like, can be immediately verified by a central computer or the shuffler itself by indicating that a specific value or rank of hand was properly dealt to a specific position on the table. Present-day security may sometimes have to hand-verify an entire deck or set of cards, which can take five to ten minutes of table downtime. This is distracting to players and is an economic loss for the casino.

A casino might choose to use the device as a back-room card verification station from time to time. Rather than use the shuffler to randomize cards in the pit or on the table, a casino might want to locate the device in a card preparation room. Casinos commonly verify that all cards in new decks or packs of multiple decks are present before putting the cards into play. Additionally, casino security procedures may require that all cards from a game be accounted for at the end of a shift, or when it is determined that the cards should be removed from play.

For example, the device may be used to check the completeness of the deck prior to play and/or prior to retiring or decommissioning cards. A casino might receive cards either in pack order or in a random order from the manufacturer. It is fairly easy to spread out a deck of ordered cards and confirm visually that all the cards are present, but when the cards are randomized prior to packaging, a (manual) visual indication is no longer possible. It would be desirable to read the cards to check that the decks or packs of decks are complete, prior to using the cards in a live casino game.

For instance, in the game of standard blackjack, the casino typically combines eight decks of 52 cards each, with jokers removed. The casino could use the device of the present invention to confirm that each of the 416 cards is present and that no additional cards are present. The casino might also want to use a card verification station to verify that packs of cards removed from play are complete, as a security measure, prior to decommissioning the cards. The casino could run the packs through the device to check the packs for this purpose also.

Figure 11:
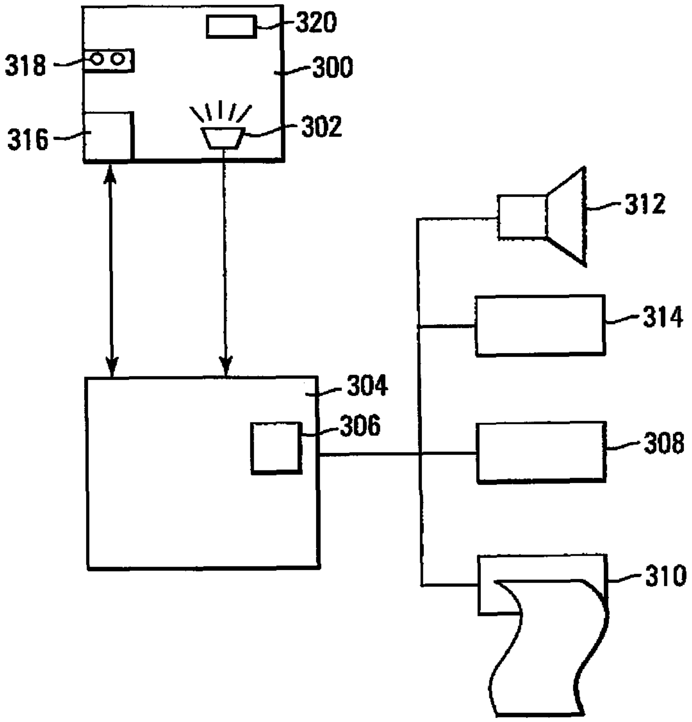
FIG. 11 is a schematic diagram showing an embodiment of the device used in the deck verification mode.

Referring now to FIG. 11, when a card verification device 300 is used as a back-end deck or pack checker, it is preferable that card reader 302 located in the card verification device 300 be in information communication with an external computer 304. Residing within the external computer 304 is memory 306 holding card information regarding the standard composition of the deck or packs of decks of cards. A comparison program (not shown) also resides in memory 306 and is provided so that, after the card reader 302 scans each card to be verified, the program can compare the scanned values to actual values and creates a report. The data may be shown on an external display, such as a monitor 308, with or without touch screen controls, may be printed in a printer 310, may be transmitted as an audible signal from a speaker 312, or combinations thereof.

Information that is typically input into the external computer 304 via a keyboard 314, touch pad controls, joystick, voice command or other known data input means prior to checking the decks might include: a) the identity of the card verification station equipment, b) the identity of the dealer who is either about to receive or has just removed cards from the table, c) the pit number, d) a table i.d., e) the number of packs to be sorted, f) the identity of the game, g) the number of decks in the pack, h) the date, i) the shift, j) the identity of the operator, and k) any other information useful in creating an identity for the pack of cards being sorted.

The computer outputs information such as the mode of operation (in this case the verification mode), the number of cards missing, the number of extra cards, the identity of cards missing, the identity of extra cards, the fact that the pack of cards is complete, the table i.d., the dealer i.d., the pit i.d., the game, the employee i.d., the date, time, shift, and any other data that has been input and is requested by the casino.

The card verification device 300 has its own internal processor 316 that controls the operation of the card verification device 300. The internal processor 316 will issue commands to motors, elevators, and the like, to accomplish card movement at the request of a dealer input device 318 or an instruction from the external computer 304. In one embodiment (not shown) only the card reader 302 is in communication with the external computer 304. In another, more preferred, example of the invention, both the internal processor 316 and the card reader 302 are in communication with the external computer 304. The internal processor 316 might notify the external computer 304 when a batch has started to process or when a batch is complete, for example. If the card verification device 300 has an integral external display 320 (such as an LED, LCD, multi-segment or graphic display, for example), the display 320 can receive information from the external computer 304 on the nature and format of information to display. Any information that is included on monitor 308 could also be shown on the display 320 affixed to the card verification device 300 itself.

The card verification device of the present invention may be used to read and verify cards at various stages of card use, as the verification of cards is often desirable before, during and after play of casino card games. The device can also simultaneously shuffle and verify cards, which is an additional benefit to casinos, as both operations can be handled at one time, eliminating extra handling, time and labor.

Although a description of preferred embodiments has been presented, various changes, including those mentioned above, could be made without deviating from the spirit of the present invention. It is desired, therefore, that reference be made to the appended claims rather than to the foregoing description to indicate the scope of the invention.

What is claimed is:

1. A device for verifying groups of cards and for forming a random set of playing cards, the device comprising:
- a card receiving area sized and shaped to receive an initial set of playing cards;
- a randomizing system comprising moving parts configured to randomize an order of the initial set of playing cards, wherein at least one of the moving parts of the randomizing system is deactivated when the device is used only for verification;
- a card collection surface in a card collection area of the randomizing system sized and shaped to receive playing cards from the initial set one at a time and, when the device is being used only for verification, cards received on the card collection surface without randomizing the initial set of playing cards;
- a processor programmed to control the randomizing system, to deactivate the at least one of the moving parts of the randomizing system when the device is used only for verification, and to activate the at least one of the moving parts of the randomizing system when the device is used for forming a random set of playing cards; and
- an image capture device positioned to read rank and suit of each card before being received on the card collection surface.

2. A method of processing a group of cards, the method comprising:
- placing a group of cards to be processed into a card in-feed tray of a multiple-mode card-handling device;
- selecting a mode of operation of the multiple-mode card-handling device selected from the group consisting of card verification, randomization, and simultaneous card verification and randomization;
- removing cards individually from the card in-feed tray and delivering the cards into a single card collection area, the card collection area having a single movable lower surface and a stationary opening for receiving cards from the in-feed tray;
- imaging cards prior to the cards entering the card collection area during verification;
- elevating the movable lower surface to a randomly determined height with an elevator during randomization;
- grasping at least one edge of a group of cards with at least one gripper in the card collection area at a point just above the stationary opening during randomization;
- lowering the movable lower surface to create an opening in a stack of cards formed on the movable lower surface, the opening located just beneath a lowermost point where the cards are grasped during randomization;
- inserting a card removed from the in-feed tray into the opening;
- disabling at least one of the grasping with the at least one gripper and the elevating the movable lower surface to a randomly determined height with the elevator during verification;
- after processing the cards, elevating a collection of the cards; and
- when the cards have been imaged, comparing read values of the cards with stored values to verify the cards.

3. The method of claim 2, wherein, during randomization, after a card has been inserted and when a presence of at least one additional card in the card in-feed tray is sensed, moving the movable lower surface to another randomly determined height to create another opening.

4. A device for forming a random set of playing cards or for verifying a set of playing cards, the device comprising:
- a single card receiving area sized and shaped to receive an initial set of playing cards;
- a randomizing system comprising moving parts configured to randomize an order of an initial set of playing cards during operation of the device in a randomization mode, wherein the randomizing system is configured to be disabled by not moving at least some of the moving parts during operation of the device in a playing card set verification mode, while allowing cards to be moved and verified by the device;
- at least one processor programmed to control movement of the moving parts of the randomization system during operation of the device in the randomization mode and programmed to disable the randomizing system during operation of the device in the playing card set verification mode;
- a single card collection surface in a card collection area of the randomizing system sized and shaped to receive playing cards one at a time from the initial set of playing cards and to form a single randomized set of playing cards during the randomization mode, the single card collection surface positioned to receive the playing cards from the initial set of playing cards below a top surface of the device;
- an image capture device positioned to read rank and suit of each card of the initial set of playing cards after the card has begun leaving the single card receiving area and before being received on the single card collection surface; and a card delivery area comprising at least two, three, or four walls extending above the top surface of the device and positioned such that the single randomized set of playing cards is to be supported by the at least two walls and to be removed from the card delivery area of the device as a complete set.

5. The device of claim 4, wherein the playing card collection surface comprises a surface that is movable by an elevator.

6. The device of claim 5, wherein the elevator is configured to raise the playing card collection surface after operation of the device in the randomization mode or in the verification mode so that, during removal from the card delivery area, at least some cards are elevated above the top surface of the device.

7. A multiple-mode card handling device for shuffling cards and verifying cards, the device comprising:

a card receiving area sized and shaped to receive an initial set of unshuffled cards;

a card randomizing system configured to randomize an order of the cards during use of the device in a shuffling mode;

a first sensor oriented to sense a position of cards between the card receiving area and the card randomizing system;

a second sensor oriented to sense rank and/or suit of each card; and a microprocessor programmed to activate the second sensor upon receiving a card present signal from the first sensor and to deactivate the card randomization system during use of the device in card verification mode.

8. A device for handling playing cards having at least two modes of operation, the device comprising:

a card in-feed tray;

a card shuffling mechanism including moving components;

a first card transfer mechanism configured to move cards from the card in-feed tray to the card shuffling mechanism;

an imager positioned to read cards within the device;

a second card transfer mechanism configured to move cards out of the card shuffling mechanism; and at least one processor programmed to operate the device in a shuffling mode during which moving components of the card shuffling mechanism are used and in a card verification mode during which movement of at least some of the moving parts of the card shuffling mechanism is disabled.

9. The device of claim 8, wherein the imager comprises a camera.

10. The device of claim 8, wherein the imager is positioned to enable imaging of cards between the card in-feed tray and the card shuffling mechanism.

11. The device of claim 8, wherein the at least one processor is internal to the device and further comprising an external processor programmed to interpret card images from the imager.

12. The device of claim 8, further comprising an external computer, wherein the external computer has memory and within the memory is stored information regarding a composition of at least one complete deck of cards.

13. The device of claim 8, wherein the at least one processor is programmed to compare read-card information to stored information and to provide an output of one or more of at least a) cards present, b) cards missing, c) extra cards, and d) an indication that the group of cards is complete.

14. The device of claim 8, further comprising a user interface.

15. The device of claim 14, wherein the user interface is selected from the group consisting of a keyboard, a touch screen, a joystick, and a button panel.

* * * * *

UNITED STATES PATENT AND TRADEMARK OFFICE

CERTIFICATE OF CORRECTION

PATENT NO. : 8,444,147 B2
APPLICATION NO. : 12/834653
DATED : May 21, 2013
INVENTOR(S) : Atilla Grauzer et al.

It is certified that error appears in the above-identified patent and that said Letters Patent is hereby corrected as shown below:

In the specification:

COLUMN 6, LINE 33, change "one faun" to --one form--

Signed and Sealed this
Fifteenth Day of September, 2015

Michelle K. Lee
*Director of the United States Patent and Trademark Office*